United States Patent
Shirahama et al.

(10) Patent No.: US 10,815,334 B2
(45) Date of Patent: Oct. 27, 2020

(54) POLYESTER RESIN, PRODUCTION METHOD FOR SAID POLYESTER RESIN, AND POLYESTER RESIN COMPOSITION

(71) Applicant: MITSUBISHI CHEMICAL CORPORATION, Chiyoda-ku (JP)

(72) Inventors: Rie Shirahama, Chiyoda-ku (JP); Tatsuya Hitomi, Chiyoda-ku (JP); Atsushi Kasai, Chiyoda-ku (JP)

(73) Assignee: MITSUBISHI CHEMICAL CORPORATION, Chiyoda-ku (JP)

( * ) Notice: Subject to any disclaimer, the term of this patent is extended or adjusted under 35 U.S.C. 154(b) by 79 days.

(21) Appl. No.: 15/911,331

(22) Filed: Mar. 5, 2018

(65) Prior Publication Data

US 2018/0186927 A1 Jul. 5, 2018

Related U.S. Application Data

(63) Continuation of application No. PCT/JP2016/075716, filed on Sep. 1, 2016.

(30) Foreign Application Priority Data

Sep. 4, 2015 (JP) ................. 2015-174871
Sep. 4, 2015 (JP) ................. 2015-174872
Mar. 29, 2016 (JP) ................. 2016-066762

(51) Int. Cl.
| | | |
|---|---|---|
| C08G 63/199 | (2006.01) |
| C08G 63/181 | (2006.01) |
| C08G 63/80 | (2006.01) |
| C08K 5/098 | (2006.01) |
| C08K 5/13 | (2006.01) |
| C08K 5/36 | (2006.01) |
| C08K 3/00 | (2018.01) |
| C08K 5/29 | (2006.01) |
| C08K 5/1515 | (2006.01) |
| C08K 5/49 | (2006.01) |
| C08K 3/40 | (2006.01) |
| C08K 7/14 | (2006.01) |

(52) U.S. Cl.
CPC ......... *C08G 63/199* (2013.01); *C08G 63/181* (2013.01); *C08G 63/80* (2013.01); *C08K 3/00* (2013.01); *C08K 3/40* (2013.01); *C08K 5/098* (2013.01); *C08K 5/13* (2013.01); *C08K 5/1515* (2013.01); *C08K 5/29* (2013.01); *C08K 5/36* (2013.01); *C08K 5/49* (2013.01); *C08K 7/14* (2013.01)

(58) Field of Classification Search
CPC .................................................. C08G 63/199
See application file for complete search history.

(56) References Cited

U.S. PATENT DOCUMENTS

| | | | | |
|---|---|---|---|---|
| 5,852,164 A | * | 12/1998 | Akai | .................... C08G 63/199 528/279 |
| 6,642,288 B1 | * | 11/2003 | Hulskotte | .......... C08K 5/34928 524/100 |
| 2004/0034126 A1 | | 2/2004 | Garrison et al. | |
| 2005/0222345 A1 | * | 10/2005 | Nakayama | .............. C08L 67/02 525/419 |
| 2009/0215933 A1 | | 8/2009 | Kasai et al. | |
| 2011/0020660 A1 | | 1/2011 | Bastioli et al. | |
| 2011/0071238 A1 | | 3/2011 | Bastioli et al. | |
| 2013/0095263 A1 | * | 4/2013 | Carman, Jr. | ......... C08G 63/199 428/35.7 |
| 2013/0095268 A1 | | 4/2013 | Carman, Jr. et al. | |
| 2013/0095269 A1 | | 4/2013 | Carman, Jr. et al. | |
| 2013/0095270 A1 | | 4/2013 | Carman, Jr. et al. | |
| 2013/0095271 A1 | | 4/2013 | Carman, Jr. et al. | |
| 2013/0095272 A1 | | 4/2013 | Carman, Jr. et al. | |
| 2016/0200862 A1 | | 7/2016 | Bastioli et al. | |
| 2016/0319066 A1 | | 11/2016 | Shimoharai et al. | |

FOREIGN PATENT DOCUMENTS

| | | |
|---|---|---|
| CN | 100334151 C | 8/2007 |
| CN | 101218279 A | 7/2008 |
| CN | 101511907 A | 8/2009 |
| CN | 101981081 A | 2/2011 |
| CN | 102027037 A | 4/2011 |
| CN | 102516513 A | 6/2012 |
| CN | 102952260 A | 3/2013 |
| CN | 103261265 A | 8/2013 |
| CN | 103570925 A | 2/2014 |
| CN | 105754077 | 7/2016 |
| EP | 1 903 067 A1 | 3/2008 |
| JP | 07-102153 | 4/1995 |
| JP | 10-182803 | 7/1998 |
| JP | 2000-178349 | 6/2000 |
| JP | 2001-114887 A | 4/2001 |
| JP | 2005-523983 | 8/2005 |
| JP | 2006-089629 | 4/2006 |

(Continued)

OTHER PUBLICATIONS

International Preliminary Report on Patentability and Written Opinion dated Mar. 15, 2018 in PCT/JP2016/075716 filed Sep. 1, 2016, (English translation only).

(Continued)

*Primary Examiner* — Vu A Nguyen
(74) *Attorney, Agent, or Firm* — Oblon, McClelland, Maier & Neustadt, L.L.P.

(57) ABSTRACT

There is provided a polyester resin including a 2,5-furandicarboxylic acid unit and a cyclohexanedimethanol unit in a main chain, in which the polyester resin is high in molecular weight, has heat resistance and hydrolysis resistance, and is excellent in mechanical properties and melt heat stability. There is also provided a method for producing a polyester resin having the above characteristics. A polyester resin including a 2,5-furandicarboxylic acid unit and a 1,4-cyclohexanedimethanol unit as main constituent components, wherein the following (I) and (II) are satisfied: (I) the reduced viscosity ($\eta sp/c$) is 0.7 dL/g or more; and (II) the sum of a cyclovinylidene terminal and a methylcyclohexene terminal is 80 µeq/g or less.

12 Claims, No Drawings

(56) References Cited

FOREIGN PATENT DOCUMENTS

| | | |
|---|---|---|
| JP | 2008-007750 | 1/2008 |
| JP | 2008-291243 | 12/2008 |
| JP | 2008-291244 | 12/2008 |
| JP | 2011-518235 | 6/2011 |
| JP | 2011-520005 | 7/2011 |
| JP | 2011-208008 | 10/2011 |
| JP | 2013-053270 | 3/2013 |
| JP | 2013-127084 A | 6/2013 |
| JP | 2013-155389 | 8/2013 |
| JP | 2016-102173 | 6/2016 |
| KR | 10-2015-0076049 A | 7/2015 |
| WO | WO 2013/055860 A1 | 4/2013 |
| WO | WO 2014/100256 A2 | 6/2014 |
| WO | WO 2015/093524 A1 | 6/2015 |
| WO | WO 2015/137805 A1 | 9/2015 |

OTHER PUBLICATIONS

Partial Supplementary European Search Report dated Aug. 2, 2018 in U.S. Appl. No. 16841978.6, 11 pages.

International Search Report dated Nov. 1, 2016 in PCT/JP2016/075716 filed Sep. 1, 2016.

Yoshikazu Hachihama, et al, "Syntheses of Polyesters containing Furan Ring," No. 333, 1958, pp. 475-480.

Office Action dated Nov. 6, 2019 in European Patent Application No. 16 841 978.6.

Jun et al., "Polymer Synthesis Technology", East China University of Science and Technology Press, Feb. 2011, pp. 213-214 (with English Translation).

Office Action dated Nov. 27, 2019, in Chinese Patent Application No. 201680050980.3, filed Sep. 1, 2016 (with English Translation).

Office Action dated Aug. 19, 2020 in Chinese Patent Application No. 201680050980.3 filed Sep. 1, 2016 (with English Translation).

* cited by examiner

POLYESTER RESIN, PRODUCTION METHOD FOR SAID POLYESTER RESIN, AND POLYESTER RESIN COMPOSITION

CROSS-REFERENCE TO RELATED APPLICATION

This is a continuation of International Application PCT/JP2016/075716, filed on Sep. 1, 2016, and designated the U.S., and claims priority from Japanese Patent Application 2015-174871 which was filed on Sep. 4, 2015, Japanese Patent Application 2015-174872 which was filed on Sep. 4, 2015 and Japanese Patent Application 2016-066762 which was filed on Mar. 29, 2016, the entire contents of which are incorporated herein by reference.

TECHNICAL FIELD

The present invention relates to a polyester resin having a furandicarboxylic acid unit and a cyclohexanedimethanol unit. Specifically, the present invention relates to a polyester resin which has a furandicarboxylic acid unit and a cyclohexanedimethanol unit in a main chain, which can be produced from a biomass-derived raw material, which also has a sufficient molecular weight, which has heat resistance and hydrolysis resistance and which is excellent in mechanical properties and melt heat stability, as well as a method for producing the polyester resin.

BACKGROUND ART

In recent years, resins having biodegradability and resins using biomass-derived raw materials have been developed and put into practical use as environmentally conscious or environmentally persistent materials. Such resins, however, are currently inferior in production cost, mechanical properties and thermal properties as compared with conventional general-purpose resins, engineering plastics, and the like. Such resins also have the disadvantages of being poor in hydrolysis resistance, light resistance and the like, and being not endurable against long time use.

Currently, aromatic polyester resins such as polyethylene terephthalate and polybutylene terephthalate which are thermoplastic resins excellent in heat resistance and mechanical properties are widely utilized as general-purpose materials and engineering component-related materials including films, food containers, electrical and electronic components, housings of home electric appliances, automobile materials, and the like. Polyethylene terephthalate and polybutylene terephthalate, however, have no chance of being put into practical use because raw materials thereof are produced from petroleum and production thereof from biomass is difficult or is very high in cost.

There has been reported a polyester using furandicarboxylic acid which can be produced from biomass, as a thermoplastic resin excellent in heat resistance (Non-Patent Document 1).

The present applicants have developed a polyester resin having a 2,5-furandicarboxylic acid unit as a dicarboxylic acid unit and respective units of ethylene glycol, trimethylene glycol and 1,4-butanediol, as diol units, wherein the polyester resin is high in molecular weight and excellent in heat resistance, mechanical properties and weather resistance (Patent Document 1).

The present applicants have also developed a method for producing a polyester resin, including subjecting a furandicarboxylic acid dialkyl ester component and a diol component to a transesterification reaction and thereafter a polycondensation reaction in the presence of a titanium compound (Patent Document 2). The production method can be used to thereby provide a polyester resin high in molecular weight and excellent in heat resistance, mechanical properties and weather resistance.

There has also been disclosed a homopolymer (PCF) formed from a 2,5-furandicarboxylic acid unit and a cyclohexanedimethanol unit (Patent Document 3). PCF is characterized by being high in melting point and high in crystallization speed, and is excellent in heat resistance.

PRIOR ART DOCUMENT

Patent Documents

Patent Document 1: JP 2008-291243 A
Patent Document 2: JP 2008-291244 A
Patent Document 3: WO 2013/055860

Non-Patent Document

Non-Patent Document 1: Y. Hachihama et al, Osaka Daigaku Kogaku Hokoku, 8, 475-480 (1958) "Synthesis of Polyesters containing Fran Ring"

SUMMARY OF INVENTION

Problems to be Solved by the Invention

The present inventors, however, have found that Patent Documents 1 to 3 above have the following problems.

The polyester described in Patent Document 1 is low in melting point as compared with aromatic polyesters such as PET and PBT, and thus is insufficient in heat resistance and is limited in terms of application development as molded products. In the production method of Patent Document 2, the crystallization speed may be decreased in production of PCF, and deterioration in heat resistance and/or any problems about heat stability in melting and hydrolysis resistance may be caused.

On the other hand, PCF described in Patent Document 3 may be decreased in crystallization speed depending on the production conditions. In addition, a decomposition reaction easily occurs during the polymerization reaction, thereby increasing the carboxylic acid terminal concentration and the vinyl terminal concentration in some cases, and, in such cases, there are the following tendencies: the molecular weight is hardly increased, and deterioration in heat resistance and/or any problems about heat stability in melting and hydrolysis resistance are caused.

An object of the present invention is to provide a polyester resin which is high in molecular weight, which has heat resistance and hydrolysis resistance, and which is excellent in mechanical properties and melt heat stability, by use of a biomass-derived raw material. A specific object of the present invention is to provide an industrially useful material contributing to environmental problems, global warming problems, food problems, and the like by production of a polyester resin by increasing the molecular weight of a polyester using 2,5-furandicarboxylic acid that can be produced from a plant-derived raw material such as xylose, cellulose or glucose which is disposed as an agricultural waste.

Means for Solving the Problems

The present inventors have made intensive studies for solving the above problems, and as a result, have found that a specified polyester resin having a 2,5-furandicarboxylic acid unit and a cyclohexanedimethanol unit in a main chain is high in molecular weight, has heat resistance and hydrolysis resistance, and is excellent in mechanical properties and melt heat stability, thereby leading to completion of the present invention. Furthermore, the inventors have found that a method for producing the polyester resin is high in reaction rate and the resulting polyester resin is high in molecular weight, has heat resistance and hydrolysis resistance, and is excellent in mechanical properties and melt heat stability, thereby leading to completion of the present invention.

Furthermore, the inventors have found a novel polyester resin having a constituent unit derived from 2,5-furandicarboxylic acid and a constituent unit derived from a specified diol, the polyester resin containing a specified amount of an alkali metal.

That is, the gist of the present invention is as follows.
[1] A polyester resin including a 2,5-furandicarboxylic acid unit and a 1,4-cyclohexanedimethanol unit as main constituent components, wherein
the following (I) and (II) are satisfied:
(I) a reduced viscosity ($\eta sp/c$) is 0.7 dL/g or more; and
(II) a sum of a cyclovinylidene terminal represented by the following formula (1) and a methylcyclohexene terminal represented by the following formula (2) is 80 μeq/g or less.

[Formula 1]

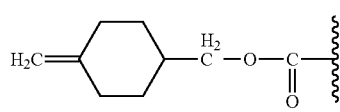

(1)

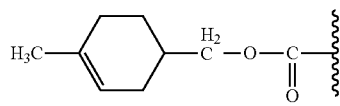

(2)

[2] The polyester resin according to [1], wherein a difference between a melting point (Tm) and a cooling crystallization temperature (Tmc) measured by DSC is 50° C. or less.
[3] The polyester resin according to [1] or [2], the following (III) is further satisfied:
(III) a carboxylic acid terminal is 30 μeq/g or less.
[4] The polyester resin according to any of [1] to [3], containing 0.5 to 1000 ppm of an alkali metal.
[5] A polyester resin including a constituent unit derived from 2,5-furandicarboxylic acid and a constituent unit derived from a diol having 2 or more and 10 or less carbon atoms, wherein
the polyester resin includes 0.5 to 1000 ppm of an alkali metal.
[6] A polyester resin composition including the polyester resin according to any of [1] to [5].
[7] The polyester resin composition according to [6], further including at least one compound selected from the group consisting of a phosphorus-based compound, a sulfur-based compound and a phenol-based compound.
[8] The polyester resin composition according to [6] or [7], further including at least one compound selected from the group consisting of an epoxy-based compound, an isocyanate-based compound and a carbodiimide-based compound.

[9] The polyester resin composition according to any of [6] to [8], further including a filler.
[10] A method for producing a polyester resin by melt polymerization using a dicarboxylic acid and/or a dicarboxylic acid ester, and a diol, wherein
the dicarboxylic acid and/or the dicarboxylic acid ester include(s) 2,5-furandicarboxylic acid and/or 2,5-furandicarboxylic acid ester,
the diol includes 1,4-cyclohexanedimethanol, and
the method includes the following step (IV) and step (V):
(IV) a step of performing an esterification or transesterification reaction; and
(V) a step of, thereafter, performing polycondensation under reduced pressure at a temperature (t1) represented by the following expression (3):

$$Tm \leq t1 \leq Tm+15° C. \quad (3)$$

Tm: melting point of polyester resin.
[11] The method for producing a polyester resin according to claim 10, further including the following step (VI):
(VI) a step of performing solid phase polymerization at a temperature (t2) represented by the following expression (4), after melt polymerization:

$$t2 \leq Tm \quad (4)$$

Tm: melting point of polyester resin.

EFFECT OF INVENTION

The present invention can provide an industrially useful material which is high in molecular weight, which has heat resistance and hydrolysis resistance, and which is excellent in mechanical properties and melt heat stability, by a specified polyester resin having a 2,5-furandicarboxylic acid unit and a cyclohexanedimethanol unit in a main chain, which can be produced from a biomass raw material. The invention can also provide a method for producing a polyester resin, wherein the method is high in reaction rate, and the resulting polyester resin is high in molecular weight, has heat resistance and hydrolysis resistance and is excellent in mechanical properties and melt heat stability.

MODE FOR CARRYING OUT THE INVENTION

Hereinafter, representative embodiments for carrying out the present invention will be specifically described, but the present invention is not intended to be limited to the following embodiments as long as it does not depart from the gist thereof.
[Polyester Resin]
<2,5-Furandicarboxylic Acid Unit>
One embodiment of the present invention relates to a polyester resin. The polyester resin includes a dicarboxylic acid unit and a diol unit as main constituent units. The "main" constituent unit refer to any constituent unit occupying the highest proportion among constituent units constituting the polyester resin, and usually occupies 50% by mass or more, preferably 60% by mass or more, more preferably 70% by mass or more, further preferably 80% by mass or more, particularly preferably 90% by mass or more in all the constituent units.

The dicarboxylic acid unit constituting the polyester resin includes a 2,5-furandicarboxylic acid unit. When such a unit is used for production of the polyester resin, 2,5-furandicarboxylic acid and a derivative thereof can be used. Examples of the derivative of 2,5-furandicarboxylic acid include an alkyl ester having 1 to 4 carbon atoms, and in particular, methyl ester, ethyl ester, n-propyl ester, isopropyl ester, butyl ester or the like is preferable and methyl ester is further preferable.

The proportion of the 2,5-furandicarboxylic acid unit in the dicarboxylic acid unit constituting the polyester resin is not particularly limited, and it is preferably 50% by mass or more, more preferably 60% by mass or more, further preferably 70% by mass or more, particularly preferably 80% by mass or more. The upper limit is not particularly set, and it may be 100% by mass. When the proportion falls within such ranges, crystallinity of the polyester resin tends to be kept and heat resistance tends to be achieved.

<Other Dicarboxylic Acid Unit>

In the polyester resin, a dicarboxylic acid unit other than the 2,5-furandicarboxylic acid unit may also be copolymerized. When the dicarboxylic acid unit other than the 2,5-furandicarboxylic acid unit is copolymerized, the proportion thereof in the entire dicarboxylic acid unit is preferably 10% by mass or less, more preferably 5% by mass or less, and is preferably 0.1% by mass or more. When the proportion falls within such ranges, the melting point can be slightly decreased with no crystallinity being impaired. Thus, it tends to be possible to set the polymerization temperature and the processing temperature to slightly lower values, and to suppress a decomposition reaction and a decrease in molecular weight in melting.

Examples of the copolymerizable dicarboxylic acid unit include an aromatic dicarboxylic acid compound, an aliphatic (also including alicyclic) dicarboxylic acid, and derivatives obtained by esterification thereof.

Specific examples of the copolymerizable aromatic dicarboxylic acid include terephthalic acid, isophthalic acid, naphthalenedicarboxylic acid and diphenyldicarboxylic acid. In addition, derivatives thereof may also be included. Examples of the derivative of the aromatic dicarboxylic acid include an alkyl ester having 1 to 4 carbon atoms, and in particular, methyl ester, ethyl ester, n-propyl ester, isopropyl ester, butyl ester or the like is preferable and methyl ester is further preferable.

These may be used singly or as a mixture of two or more thereof.

Specific examples of the copolymerizable aliphatic (also including alicyclic) dicarboxylic acid include oxalic acid, succinic acid, glutaric acid, adipic acid, sebacic acid, dimer acid, dodecanedioic acid and 1,6-cyclohexanedicarboxylic acid. Acid anhydrides thereof may also be included. Examples of the derivative of the aliphatic (also including alicyclic) dicarboxylic acid include a lower alkyl ester of such an aliphatic (also including alicyclic) dicarboxylic acid. Among them, succinic acid, glutaric acid, sebacic acid, dimer acid, dodecanedioic acid or its lower alkyl (for example, alkyl having 1 to 4 carbon atoms) ester derivative is preferable, and in particular, succinic acid, a lower alkyl ester derivative of succinic acid, or a mixture thereof is preferable. These may be used singly or as a mixture of two or more thereof.

<1,4-Cyclohexanedimethanol Unit>

The diol unit constituting the polyester resin preferably includes a 1,4-cyclohexanedimethanol unit.

When such a unit is used for production of the polyester resin, 1,4-cyclohexanedimethanol is mainly used. Examples of 1,4-cyclohexanedimethanol include a cis-isomer, a trans-isomer or a mixture thereof. In the case of the mixture, the proportion of the trans-isomer is preferably 60% or more, more preferably 65% or more, further preferably 70% or more, and is preferably 90% or less, more preferably 80% or less. When the proportion of the trans-isomer falls within the above range, the melting point tends to fall within a proper range, and heat resistance and productivity tend to be excellent.

<Other Diol Unit>

In the polyester resin, a small amount of a diol unit other than 1,4-cyclohexanedimethanol may also be copolymerized, and the amount of such other diol unit is preferably less than 1% by mol relative to the diol unit. When the amount of such other diol unit is less than the above value, the melting point tends not to be excessively decreased, and heat resistance tends to be achieved.

The copolymerizable diol unit is preferably an aliphatic and/or alicyclic diol having 2 to 10 carbon atoms, and examples thereof include ethylene glycol, diethylene glycol, triethylene glycol, 1,3-propanediol, 1,2-propanediol, 1,4-butanediol, 1,5-pentanediol, 1,6-hexanediol, 1,4-cyclohexanediol and isosorbide.

These may be used singly or as a mixture of two or more thereof.

<Diol Unit Having 2 or More and 10 or Less Carbon Atoms>

In one embodiment, the polyester resin is a polyester resin including a constituent unit derived from 2,5-furandicarboxylic acid and a constituent unit derived from a diol having 2 or more and 10 or less carbon atoms. The diol having 2 or more and 10 or less carbon atoms here may be an aliphatic diol or may be an alicyclic diol. Specific examples include ethylene glycol, diethylene glycol, triethylene glycol, 1,3-propanediol, 1,2-propanediol, 1,4-butanediol, 1,5-pentanediol, 1,6-hexanediol, 1,4-cyclohexanediol and isosorbide.

These may be used singly or as a mixture of two or more thereof.

<Other Component>

The polyester resin may include a small amount of a copolymerization component other than the dicarboxylic acid unit and the diol unit. The content of such other component in the polymer is here 10% by mol or less, preferably 5% by mol or less. When the content is the upper limit value or less, crystallinity of the polyester resin tends to be kept and heat resistance tends to be achieved. Examples of such a small amount of a copolymerization component include an aromatic dihydroxy compound, bisphenol, hydroxycarboxylic acid, diamine, and derivatives thereof.

The copolymerizable hydroxycarboxylic acid and hydroxycarboxylic acid derivative are not particularly limited as long as these are each a compound or a derivative thereof having one hydroxyl group and one carboxyl group in the molecule. Specific examples of the hydroxycarboxylic acid and the derivative thereof include lactic acid, glycolic acid, 2-hydroxy-n-butyric acid, 2-hydroxycaproic acid, 6-hydroxycaproic acid, 2-hydroxy 3,3-dimethylbutyric acid, 2-hydroxy-3-methylbutyric acid, 2-hydroxyisocaproic acid, mandelic acid, salicylic acid, and esters, acid chlorides and acid anhydrides thereof.

These may be used singly or as a mixture of two or more thereof.

When any optical isomer is present, it may be any of a D-isomer, an L-isomer or a racemic isomer, and may be in the form of a solid, a liquid or an aqueous solution.

A unit containing a tri- or higher functional group, as any copolymerization component other than the above copolymerization components, may also be introduced into the polyester resin.

Examples of a compound having the constituent unit having a tri- or higher functional group include at least one tri- or higher multifunctional compound selected from the group consisting of: a tri- or higher functional polyhydric alcohol; a tri- or higher functional polyvalent carboxylic acid, or an anhydride, an acid chloride or an ester thereof; a tri- or higher functional hydroxycarboxylic acid, or an anhydride, an acid chloride or an ester thereof; and a tri- or higher functional amine.

Specific examples of the tri- or higher functional polyhydric alcohol include glycerin, trimethylolpropane and pentaerythritol. These may be used singly or as a mixture of two or more thereof.

Specific examples of the tri- or higher functional polyvalent carboxylic acid or the anhydride thereof include trimesic acid, propanetricarboxylic acid, trimellitic anhydride, pyromellitic anhydride, benzophenonetetracarboxylic acid anhydride and cyclopentanetetracarboxylic acid anhydride. These may be used singly or as a mixture of two or more thereof.

Specific examples of the tri- or higher functional hydroxycarboxylic acid include malic acid, hydroxyglutaric acid, hydroxymethylglutaric acid, tartaric acid, citric acid, hydroxyisophthalic acid and hydroxyterephthalic acid. These may be used singly or as a mixture of two or more thereof.

Among them, malic acid, tartaric acid or citric acid is particularly preferable in terms of availability.

When the polyester resin contains the constituent unit having a tri- or higher functional group, the content ratio of the constituent unit to the total of all the constituent units constituting the polyester resin is usually 0.0001% by mol or more, preferably 0.001% by mol or more, further preferably 0.005% by mol or more, sometimes preferably 0.01% by mol or more, and is usually 5% by mol or less, preferably 4% by mol or less, further preferably 3% by mol or less in total.

When the content ratio of the constituent unit having a tri- or higher functional group in the polyester resin is the upper limit value or less, polymer crosslinking tends not to excessively progress, a strand tends to be stably extracted, and moldability, various physical properties and the like tend to be achieved. In addition, when the content ratio of the constituent unit having a tri- or higher functional group in the polyester resin is the lower limit value or more, a polyester resin having a proper melt viscosity tends to be obtained and moldability tends to be enhanced.

<Chain Extender and Terminal Blocking Agent>

In production of the polyester resin, a chain extender such as diisocyanate, diphenyl carbonate, dioxazoline or silicic acid ester may be used. In particular, when a carbonate compound such as diphenyl carbonate is used, it is also preferable to add such a carbonate compound at 20% by mol or less, preferably 10% by mol or less relative to all the constituent components of the polyester resin, thereby providing a polyester carbonate.

In this case, specific examples of the carbonate compound include diphenyl carbonate, ditolyl carbonate, bis(chlorophenyl) carbonate, m-cresyl carbonate, dinaphthyl carbonate, dimethyl carbonate, diethyl carbonate, dibutyl carbonate, ethylene carbonate, diamyl carbonate and dicyclohexyl carbonate. In addition thereto, a carbonate compound made of a homogeneous or heterogeneous hydroxy compound, derived from a hydroxy compound such as phenol or alcohol, can also be used.

Specific examples of the diisocyanate compound can include known diisocyanates such as 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate and isophorone diisocyanate.

Specific examples of the silicic acid ester can include tetramethoxysilane, dimethoxydiphenylsilane, dimethoxydimethylsilane and diphenyldihydroxysilane.

In order to enhance melt tension, a small amount of peroxide may also be added.

These may be each used singly or as a mixture of two or more thereof.

The polyester terminal group of the polyester resin may also be blocked by carbodiimide, an epoxy compound, a monofunctional alcohol or carboxylic acid.

In this case, examples of the carbodiimide compound serving as a terminal blocking agent include a compound having at least one carbodiimide group in the molecule (including a polycarbodiimide compound), and specific examples of the monocarbodiimide compound include dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, di-β-naphthyl carbodiimide and N,N'-di-2,6-diisopropylphenylcarbodiimide.

These may be used singly or as a mixture of two or more thereof.

<Alkali Metal>

In one embodiment, the polyester resin preferably includes 0.5 ppm or more, 1000 ppm or less of an alkali metal. The polyester resin preferably includes such a small amount of an alkali metal because a thermal decomposition reaction tends to be suppressed and melt stability tends to be improved.

The type of the alkali metal is not particularly limited, and may be any of Li, Na, K, Rb, Cs and Fr and is preferably Li, Na or K in terms of availability.

The content of the alkali metal is preferably 1 ppm or more, more preferably 5 ppm or more, and is preferably 500 ppm or less, more preferably 250 ppm or less.

<Physical Properties of Polyester Resin>

The polyester resin satisfies the following (I) and (II), and preferably satisfies the following (III):

(I) the reduced viscosity ($\eta sp/c$) is 0.7 dL/g or more;

(II) the sum of a cyclovinylidene terminal represented by the following formula (1) and a methylcyclohexene terminal represented by the following formula (2) is 80 μeq/g or less; and

[Formula 2]

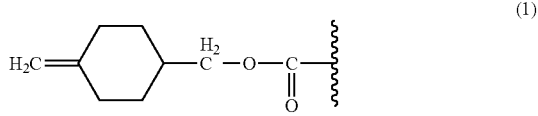

(1)

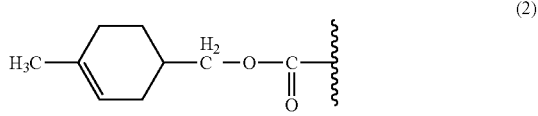

(2)

(III) a carboxylic acid terminal is 30 μeq/g or less.

((I) Reduced Viscosity)

The reduced viscosity ($\eta sp/c$) of the polyester resin is 0.7 dL/g or more, may be 0.5 dL/g or more, may be 0.6 dL/g or more, preferably 0.75 dL/g or more, more preferably 0.76 dL/g or more, further preferably 0.77 dL/g or more. The upper limit of the reduced viscosity is usually 3.0 dL/g or less, preferably 2.5 dL/g or less, more preferably 2.0 dL/g or less, further preferably 1.5 dL/g or less, still more preferably 1.2 dL/g or less, yet further preferably 1.1 dL/g or less, particularly preferably 1.0 dL/g or less. When the reduced viscosity is the lower limit value or more, a film and an injection molded product tend to be easily formed, and the resulting molded article tends to have strength. On the other hand, when the reduced viscosity is the upper limit value or less, molding tends to be facilitated.

In the present invention, the reduced viscosity ($\eta sp/c$) of the polyester resin is determined from the solution viscosity measured at 30° C. in a polyester resin concentration of 0.5 g/dL in phenol/tetrachloroethane (1:1 weight ratio).

The method for allowing the reduced viscosity ($\eta sp/c$) to be 0.7 dL/g or more is not particularly limited, and the reduced viscosity tends to be easily a specified value or more by use of a melt polymerization method and by control of a catalyst, the polymerization temperature and the like.

((II) Sum of Cyclovinylidene Terminal Represented by Formula (1) and Methylcyclohexene Terminal Represented by Formula (2))

The polyester resin has a cyclovinylidene terminal represented by formula (1) and/or a methylcyclohexene terminal represented by formula (2). The sum of the cyclovinylidene terminal represented by formula (1) and the methylcyclohexene terminal represented by formula (2) is usually 80 µeq/g or less, preferably 70 µeq/g or less, more preferably 65 µeq/g or less, further preferably 60 µeq/g or less. The lower limit is not particularly limited, and it is preferably 0 or more. When the sum is the upper limit value or less, a polycondensation reaction tends to easily progress. In addition, the polyester resin tends to achieve heat resistance, melt stability and the like. Herein, the cyclovinylidene terminal represented by formula (1) and/or the methylcyclohexene terminal represented by formula (2) may be designated as a vinyl terminal.

The method for allowing the sum of the cyclovinylidene terminal represented by formula (1) and the methylcyclohexene terminal represented by formula (2) to fall within the above range is not particularly limited, and examples include a method for controlling a polycondensation reaction temperature such as t1 described below.

((III) Carboxylic Acid Terminal)

The polyester resin preferably includes 30 µeq/g or less of a carboxylic acid terminal, more preferably 25 µeq/g or less, further preferably 20 µeq/g or less. The lower limit is not particularly limited, and it is 0 or more. When the polyester resin includes a carboxylic acid terminal at the upper limit value or less, heat resistance, hydrolysis resistance, melt stability and the like tend to be achieved.

The method for allowing the carboxylic acid terminal to be included within the above ranges is not particularly limited, and examples include a method for controlling a polycondensation reaction temperature such as t1 described below.

(Difference Between Melting Point (Tm) and Cooling Crystallization Temperature (Tmc) Measured by DSC)

In the polyester resin, the difference (hereinafter, sometimes designated as "Tm−Tmc".) between the melting point (Tm) and the cooling crystallization temperature (Tmc) measured by DSC may be 60° C. or less, may be 55° C. or less, and is preferably 50° C. or less, more preferably 45° C. or less, further preferably 40° C. or less. The lower limit is not particularly set, and may also be 0 (Tm=Tmc), provided that Tm≥Tmc is satisfied.

When Tm−Tmc is the upper limit value or less, crystallization tends to easily progress in molding and a molded article favorable in heat resistance tends to be obtained. In addition, favorable releasing in injection molding is easily made, thereby contributing to an enhancement in productivity.

The measurement conditions of DSC are as follows: the polyester resin is heated from 30° C. to 300° C. at a rate of 10° C./min, subsequently cooled to 30° C. at the same rate and further heated to 300° C. at the same rate. The temperature of the maximum endothermic peak observed in the second heating step is defined as Tm, the temperature of the exothermic peak observed in the cooling step is defined as Tmc, and the temperatures of the peak tops are read.

The method for allowing Tm−Tmc to fall within the above range is not particularly limited, and examples include a method for controlling a polycondensation reaction temperature t1 described below so that the temperature is not excessively raised.

(Melting Point (Tm) of Polyester Resin)

Tm of the polyester resin, measured by DSC, is not particularly limited as long as Tm−Tmc falls within the range. Tm is preferably 290° C. or less, further preferably 280° C. or less, and is preferably 240° C. or more, further preferably 250° C. or more. When Tm falls within such ranges, a molded article favorable in moldability and excellent in heat resistance tends to be obtained.

Herein, the method for measuring Tm is the same as that listed in Tm−Tmc described above.

The number average molecular weight of the polyester resin is not particularly limited, and it is preferably 30000 or more, further preferably 35000 or more, particular preferably 37000 or more, and is preferably 100000 or less, more preferably 80000 or less, further preferably 70000 or less, still more preferably 50000 or less, yet further preferably 48000 or less, particular preferably 45000 or less. When the number average molecular weight falls within such ranges, moldability and heat resistance tend to be improved. Herein, the number average molecular weight can be measured by GPC as described in Examples.

[Method for Producing Polyester Resin]

A known method with respect to polyester resin production can be adopted in the method for producing a polyester resin. For example, there can be adopted a common method for melt polymerization where a dicarboxylic acid and/or a dicarboxylic acid ester, and a diol are used to perform an esterification reaction and/or a transesterification reaction and thereafter a polycondensation reaction under reduced pressure is performed. In addition, a method for producing a polyester resin by melt polymerization described below, the method including further performing solid phase polymerization, or the like can be used.

The polyester resin is preferably produced in the presence of a catalyst. Examples of the catalyst to be used include catalysts described below, and the timing of addition, the amount, and the like can also be appropriately adjusted.

Examples of raw materials of the polyester resin, such as a dicarboxylic acid, a dicarboxylic acid ester and a diol, include respective materials listed with respect to the above polyester resin.

<Method for Producing Polyester Resin by Melt Polymerization>

The method for producing a polyester resin with a dicarboxylic acid and/or a dicarboxylic acid ester, and a diol by melt polymerization preferably includes the following step (IV) and step (V):

(IV) a step of performing an esterification or transesterification reaction; and (V) a step of, thereafter, performing polycondensation under reduced pressure at a temperature (t1) represented by the following expression (3):

$$Tm \leq t1 \leq Tm+15° C. \quad (3)$$

Tm: melting point of polyester resin.

In one embodiment, the dicarboxylic acid includes 2,5-furandicarboxylic acid and/or 2,5-furandicarboxylic acid ester, and the diol includes 1,4-cyclohexanedimethanol.

(Catalyst)

The production of a polyester resin by melt polymerization can be made using a catalyst. The time point of catalyst addition is not particularly limited, and such addition may be conducted in charging of raw materials, or may be conducted in the course of a production process. Such addition may be conducted in portions in charging of raw materials and in the course of a production process. In other words, step (IV) and/or step (V) can be performed in the presence of a catalyst.

Any catalyst which can be used for production of polyester can be selected as the catalyst, and a compound of a metal such as germanium, titanium, zirconium, hafnium, antimony, tin, magnesium, calcium, zinc, aluminum, cobalt, lead, cesium, manganese, lithium, potassium, sodium, copper, barium or cadmium is suitable. Among them, a germanium compound, a titanium compound, a magnesium compound, a tin compound, a zinc compound or a lead compound is suitable, and particularly suitable examples include a titanium compound or a magnesium compound.

The titanium compound for use as the catalyst is not particularly limited. The titanium compound is preferably tetraalkyl titanate, and specific examples thereof include tetra-n-propyl titanate, tetraisopropyl titanate, tetra-n-butyl titanate, tetra-t-butyl titanate, tetraoctyl titanate, tetraphenyl titanate, tetracyclohexyl titanate, tetrabenzyl titanate, and mixed titanates thereof. In addition, examples also include titanium (oxy) acetylacetonate, titanium tetraacetylacetonate, titanium (diisopropoxide) acetylacetonate, titanium bis(ammoniumlactato)dihydroxide, titanium bis(ethylacetoacetate) diisopropoxide, titanium (triethanolaminate) isopropoxide, polyhydroxytitanium stearate, tetrastearyl titanate, titanium lactate, titanium triethanolaminate and a butyl titanate dimer. Furthermore, examples also include titanium oxide, and a composite oxide including titanium and silicon.

Among them, tetra-n-propyl titanate, tetraisopropyl titanate, tetra-n-butyl titanate, tetraoctyl titanate, titanium (oxy) acetylacetonate, titanium tetraacetylacetonate, titanium bis(ammoniumlactato)dihydroxide, polyhydroxytitanium stearate, tetrastearyl titanate, titanium lactate, a butyl titanate dimer, titanium oxide or a titania/silica composite oxide is preferable. Furthermore, tetraisopropyl titanate, tetra-n-butyl titanate, tetraoctyl titanate, titanium (oxy) acetylacetonate, titanium tetraacetylacetonate, polyhydroxytitanium stearate, tetrastearyl titanate, titanium lactate, a butyl titanate dimer or a titania/silica composite oxide is more preferable.

The magnesium compound for use as the catalyst is not particularly limited. Preferable examples include magnesium formate, magnesium acetate, magnesium propionate, magnesium n-butyrate, magnesium n-valerate, magnesium n-caproate, magnesium n-caprate, magnesium stearate and magnesium oxide. Among them, magnesium formate, magnesium acetate or magnesium propionate is suitably used, and magnesium acetate is further suitably used.

These catalysts may be used singly or as a mixture of two or more thereof. Any other catalyst may also be used in combination as long as the objects of the present invention are not impaired.

The catalyst is particular preferably a combination of tetraalkoxy titanium with the magnesium compound because of being high in activity, and is particular preferably a combination of tetrabutyl titanate with magnesium acetate.

The amount of the catalyst to be used is preferably 0.1 ppm or more, more preferably 0.3 ppm or more, further preferably 1 ppm or more, and is preferably 3000 ppm or less, more preferably 500 ppm or less, further preferably 300 ppm or less, in terms of the amount of the metal in the catalyst relative to a polymer to be produced. When the amount of the catalyst to be used is the lower limit value or more, the reaction rate of the polymerization reaction tends to be high to thereby impart a high production efficiency. When the amount is the upper limit value or less, the production cost tends to be decreased and the catalyst residue also tends to be decreased. The catalyst residue can be decreased, thereby resulting in a tendency to suppress coloration of the resulting polyester resin, and deterioration in melt heat stability and hydrolyzability thereof.

(Step (IV))

Step (IV) is for performing an esterification or transesterification reaction of a dicarboxylic acid and/or a dicarboxylic acid ester, and a diol.

(Temperature, Time and Pressure)

The conditions such as the temperature, the time and the pressure in step (IV) can be adopted so as to fall within the ranges in a conventionally known polyester production method.

The lower limit of the temperature of the esterification or transesterification reaction of a dicarboxylic acid and/or a dicarboxylic acid ester, and a diol is usually 100° C. or more, preferably 120° C. or more, and is usually 300° C. or less, preferably 290° C. or less, further preferably 280° C. or less. When the temperature falls within such ranges, the reaction tends to efficiently progress.

The reaction atmosphere is usually an atmosphere of an inert gas such as nitrogen or argon. The reaction pressure is usually from normal pressure to 10 kPa, and is preferably normal pressure.

The reaction time is usually 1 hour or more, and the upper limit thereof is usually 10 hours or less, preferably 8 hours or less.

(Step (V))

Step (V) is subsequent to step (IV) and is for performing a polycondensation reaction under reduced pressure at a polycondensation reaction temperature (t1) represented by the following expression (3).

(Temperature, Time and Pressure)

The conditions such as the temperature, the time and the pressure in step (V) can be adopted so as to fall within the ranges in a conventionally known polyester production method.

In the subsequent polycondensation reaction, pressure reduction is started at the time point where the temperature reaches any temperature, and the lower limit of the final pressure is usually $0.01 \times 10^3$ Pa or more, preferably $0.05 \times 10^3$ Pa or more, and is usually $1.4 \times 10^3$ Pa or less, preferably $0.6 \times 10^3$ Pa or less, preferably $0.3 \times 10^3$ Pa or less. When the pressure in the polycondensation reaction is the upper limit or less, the production time of polyester tends to be prevented from being too long, a reduction in molecular weight and coloration of polyester due to thermal decomposition tend to be suppressed, and it tends to be possible to produce a polyester exhibiting sufficient characteristics for practical use. When the pressure is the lower limit value or more, production can be made without any expensive equipment dealing with extremely high vacuum.

The lower limit of the reaction time of the polycondensation reaction is usually 1 hour or more, and the upper limit thereof is usually 15 hours. The reaction time is preferably 10 hours or less, more preferably 8 hours or less. When the reaction time is the lower limit or more, the reaction tends to sufficiently occur, to thereby provide a polyester high in the degree of polymerization, and impart mechanical properties. When the reaction time is the upper limit or less, a decrease in the molecular weight of polyester due to thermal decomposition can be suppressed, and mechanical properties tend to be achieved. In addition, the carboxylic acid terminal and vinyl terminal can be decreased, and therefore heat resistance, hydrolysis resistance, melt heat stability and the like tend to be achieved.

(Polycondensation Reaction Temperature (t1) in Melt Polymerization)

The polycondensation reaction temperature (t1) in the melt polymerization in step (V) preferably falls within the range represented by expression (3).

$$Tm \leq t1 \leq Tm+15° \text{ C.} \quad (3)$$

Tm represents the melting point of the resulting polyester resin. A preferable range of Tm is the same range as that represented with respect to physical properties of the polyester resin.

The polycondensation reaction temperature (t1) is more preferably $Tm+13°$ C. or less, further preferably $Tm+10°$ C. or less.

When t1 is Tm or more, a melting form tends to be obtained, and sufficiently stirred. When $Tm+15°$ C. or less is satisfied, the crystallization speed of the polyester resin produced tends to be increased and a molded article favorable in heat resistance tends to be obtained. In addition, in injection molding or the like, mold releasing tends to be favorably made to thereby impair no appearance of a molded product, and furthermore thermal decomposition, coloration, a side-reaction and the like are suppressed to hardly cause the concentrations of the carboxylic acid terminal and the vinyl terminal to be excessive. Therefore, a polyester resin having a sufficient degree of polymerization tends to be obtained, and physical properties such as mechanical properties, heat resistance, melt heat stability and hydrolysis resistance tend to be achieved.

Furthermore, when a solid phase polymerization step described below is included after melt polymerization, t1 falls within the above range, thereby resulting in a tendency to allow features such as an increase in crystallization temperature and a decrease in the vinyl terminal to be taken over even after solid phase polymerization. In addition, a solid phase polymerization reaction tends to be efficiently performed, and a polyester resin high in molecular weight tends to be obtained.

(Addition of Alkali Metal)

In the case where the polyester resin contains an alkali metal, an alkali metal-containing raw material may be added in step (IV) in the production method, an alkali metal-containing raw material may be added before step (V), an alkali metal-containing raw material may be added after completion of the polycondensation reaction, or an alkali metal-containing raw material may be added after completion of the solid phase polymerization. Examples of the alkali metal-containing raw material to be added include an alkali metal compound.

The alkali metal compound is not particularly limited. Examples thereof suitably include carbonate, hydrogen carbonate, sulfate, oxide, hydroxide, chloride, phosphate, borate, and organic acid salts such as acetate and citrate. More preferable is carbonate, hydrogen carbonate, phosphate, borate, acetate or the like.

The amount to be added may be set so that the alkali metal content in the polyester resin is 0.5 to 1000 ppm.

(Reaction Apparatus)

A known vertical or horizontal stirring tank type reactor can be used as the reaction apparatus for producing a polyester resin. For example, when the melt polymerization is performed in two steps including a step of esterification and/or transesterification and a step of polycondensation under reduced pressure by use of the identical reaction apparatus or different reaction apparatuses, a reactor for polycondensation under reduced pressure, preferably used, is one where a condenser is connected to an exhaust pipe for pressure reduction, the pipe connecting a vacuum pump and a reactor, and a volatile component and an unreacted monomer generated in the polycondensation reaction are recovered in the condenser.

A reaction apparatus for continuously producing a polyester resin is an esterification and/or transesterification reaction tank system and is not particularly limited, and for example, a known vertical stirring complete mixing tank, vertical thermal convection type mixing tank or column type continuous reaction tank can be used. A polycondensation reaction system is also not particularly limited, and for example, a known vertical stirring polymerization tank, horizontal stirring polymerization tank or thin film evaporation type polymerization tank can be used. The esterification and/or transesterification reaction tank and the polycondensation reaction tank can be one tank, or can be multiple tanks where multiple different tanks are aligned in series.

(Molar Ratio in Charging)

In the method for producing polyester, the molar ratio of the dicarboxylic acid and/or the dicarboxylic acid ester and the diol to be charged is not particularly limited. The amount of the diol to 1 mol of the total of the dicarboxylic acid and dicarboxylic acid ester is preferably 0.9 mol or more, more preferably 1.0 mol or more, further preferably 1.01 mol or more, and is preferably 3.0 mol or less, more preferably 2.5 mol or less, further preferably 2.0 mol or less. When the molar ratio in charging is set to fall within such ranges, a sublimate in production tends to be decreased to thereby block no distillation pipe. In addition, it tends to be possible to sufficiently increase the molecular weight of the resulting polyester resin.

(Solid Phase Polymerization)

In the method for producing polyester, it is preferable to further perform solid phase polymerization after the melt polymerization. It is particularly preferable to perform the following step (VI) after the melt polymerization:

(VI) a step of performing solid phase polymerization at a reaction temperature (t2) represented by the following expression (4).

$$t2 \leq Tm \quad (4)$$

Tm represents the melting point of the resulting polyester resin. A preferable range of Tm is the same range as that represented with respect to physical properties of the polyester resin.

The polyester resin has a high crystallinity, and thus can be easily increased in the molecular weight by solid phase polymerization.

The reaction temperature (t2) is not particularly limited as long as it is Tm or less, and it is preferably 260° C. or less, more preferably 250° C. or less and is preferably 80° C. or more, more preferably 100° C. or more, further preferably 120° C. or more. When the reaction temperature (t2) falls within such ranges, it tends to be possible to further increase the molecular weight of the resulting polyester resin.

The reaction temperature (t2) of the solid phase polymerization is preferably lower than the polycondensation reaction temperature (t1) of the melt polymerization. When the reaction temperature (t2) is lower than t1, thermal decomposition and a side-reaction are suppressed, the carboxylic acid terminal and vinyl terminal concentrations are low, suppression of coloration is favorable, and a polyester resin high in molecular weight is easily obtained.

The solid phase polymerization method is not particularly limited, and examples include a method including heating a polyester resin pellet or powder under an inert gas atmosphere or under reduced pressure. Such a reaction can also be performed even in the state where the pellet or powder is left to stand or stirred. In the case of stirring, such stirring may be made by using a reaction vessel equipped with a stirring blade, or by shaking a reaction vessel.

The reaction time of the solid phase polymerization reaction is usually 0.5 hours or more, preferably 1 hour or more, more preferably 2 hours or more, and is preferably 30 hours or less, more preferably 25 hours or less, further preferably 20 hours or less. When the reaction time is the lower limit or more, the molecular weight tends to be high and sufficient mechanical properties tend to be achieved. When the reaction time is the upper limit or less, it tends to be possible to suppress coloration.

The polyester resin subjected to the solid phase polymerization is preferably increased in the molecular weight to some extent by melt polymerization in advance. The reduced viscosity of the polyester resin here is preferably 0.1 dL/g or more, more preferably 0.2 dL/g or more, further preferably 0.3 dL/g or more. The upper limit is not particularly set, and it is preferably 1 dL/g or less, more preferably 0.95 dL/g or less, further preferably 0.9 dL/g or less. When the reduced viscosity falls within the above ranges, the reaction time of the solid phase polymerization tends to be prevented from being too long, and it tends to be possible to sufficiently increase the molecular weight of the resulting polyester resin, and to suppress coloration.

The polyester resin subjected to the solid phase polymerization preferably includes 30 μeq/g or less of a carboxylic acid terminal, further preferably 25 μeq/g or less, more preferably 20 μeq/g or less. The lower limit is not particularly limited, and it is 0 or more.

The sum of the cyclovinylidene terminal and the methylcyclohexene terminal is usually 80 μeq/g or less, preferably 70 μeq/g or less, further preferably 65 μeq/g or less, more preferably 60 μeq/g or less. The lower limit is not particularly limited, and it is preferably 0 or more.

When the sum of the carboxylic acid terminal and the vinyl terminal falls within the above ranges, the solid phase polymerization tends to efficiently progress, and a polyester resin high in molecular weight tends to be obtained.

(Heat Stabilizer)

In production of the polyester resin, a heat stabilizer can also be used. Such use is preferable in that thermal decomposition in the polymerization reaction can be suppressed and the carboxylic acid terminal and vinyl terminal can be decreased.

A known stabilizer can be used as the heat stabilizer, and examples include a hindered phenol-based compound, a hindered amine-based compound and a phosphorus-based compound. Among them, a phosphorus-based compound is preferable. The heat stabilizer may be introduced in charging of raw materials, or in the course of a production process or at the stage of extraction.

Various additives such as a heat stabilizer, an antioxidant, a hydrolysis inhibitor, a crystal nucleating agent, a flame retardant, an antistatic agent, a release agent and an ultraviolet absorber may also be added to the polyester resin as long as characteristics of the polyester resin are not impaired.

Such additives may be added to a reaction apparatus before the polymerization reaction, may be added to a conveyance apparatus or the like during a period from the start of the polymerization reaction to the end of the polymerization reaction, or may be added after completion of the polymerization reaction and before extraction of a product. Alternatively, such additives may be added to a product extracted.

In molding of the polyester resin, such molding may be made by adding a crystal nucleating agent, a reinforcing agent, a thickening agent and the like, for example, a glass fiber, a carbon fiber, titanium whisker, mica, talc, boron nitride, $CaCO_3$, $TiO_2$, silica, layered silicate, polyethylene wax, and polypropylene wax, in addition to various additives described above.

<Polyester Resin Composition>

Another embodiment of the present invention relates to a polyester resin composition, and the polyester resin composition can include, in addition to the above-mentioned polyester resin, a filler, a phosphorus-based compound, a sulfur-based compound, a phenol-based compound, an epoxy-based compound, an isocyanate-based compound and a carbodiimide-based compound.

(Filler)

Various inorganic or organic fillers may be added to the polyester resin composition. Examples of such an inorganic filler include anhydrous silica, isinglass, talc, titanium oxide, calcium carbonate, diatomous earth, allophane, bentonite, potassium titanate, zeolite, sepiolite, smectite, kaolin, kaolinite, glass, limestone, carbon, wollastonite, calcined perlite, silicates such as calcium silicate and sodium silicate, aluminum oxide, magnesium carbonate, hydroxides such as calcium hydroxide, ferric carbonate, zinc oxide, iron oxide, and salts such as aluminum phosphate and barium sulfate. These may be used singly or as a mixture of two or more thereof.

When the polyester resin composition includes such an inorganic filler, the content of the inorganic filler in the polyester resin composition is usually 1 to 80% by weight, preferably 3 to 70% by weight, more preferably 5 to 60% by weight.

Examples of such an organic filler include raw starch, modified starch, pulp, chitin/chitosan, a coconut shell powder, a bamboo powder, a bark powder, and powders of kenaf, straw, and the like. Examples also include nanofiber cellulose obtained by breaking a fiber such as pulp at the nano-level. These may be used singly or as a mixture of two or more thereof.

When the polyester resin composition includes such an organic filler, the content of the organic filler in the polyester resin composition is usually 0.1 to 70% by weight, preferably 1 to 50% by weight.

If the percentage by weight of the inorganic filler and the organic filler is less than the above range, the amount of the filler to be added can be small, to thereby cause the effect of addition not to be sufficiently achieved, and if the percentage is more than the above range, mechanical properties such as tensile elongation and impact resistance are deteriorated.

(Phosphorus-based Compound, Sulfur-based Compound and Phenol-based Compound)

The polyester resin composition preferably contains at least one compound selected from the group consisting of a phosphorus-based compound, a sulfur-based compound and a phenol-based compound. Such a compound is contained, thereby providing a polyester resin composition having excellent heat resistance, mechanical properties and moldability.

A conventionally known any phosphorus-containing compound can be used as the phosphorus-based compound, and it is preferably at least one phosphorus-based compound selected from phosphorous acid, phosphoric acid and an organic phosphorus-based compound in terms of heat resistance and moldability of the resulting polyester resin composition.

An organic compound including a carbon-phosphorus bond can be widely applied as the organic phosphorus-based compound. In particular, at least one phosphorus-based organic compound selected from a phosphite compound, a phosphate compound and a phosphonite compound is preferable, and phosphite is more preferable from the viewpoint that burr and warpage in molding are decreased. Herein, phosphite may be mutually bound to thereby form diphosphite or the like. Much the same is true on phosphate and phosphonite.

Examples of the phosphite compound include triphenyl phosphite, tris(nonylphenyl)phosphite, dilauryl hydrogen phosphite, triethyl phosphite, tridecyl phosphite, tris(2-ethylhexyl)phosphite, tris(tridecyl)phosphite, tristearyl phosphite, diphenyl monodecyl phosphite, monophenyl didecyl phosphite, diphenylmono(tridecyl)phosphite, tetraphenyl dipropylene glycol diphosphite, tetraphenyltetra(tridecyl) pentaerythritol tetraphosphite, a hydrogenated bisphenol A phenolphosphite polymer, diphenyl hydrogen phosphite, 4,4'-butylidene-bis(3-methyl-6-tert-butylphenyl di(tridecyl) phosphite), tetra(tridecyl)4,4'-isopropylidenediphenyl diphosphite, bis(tridecyl)pentaerythritol diphosphite, bis (nonylphenyl)pentaerythritol diphosphite, dilaurylpentaerythritol diphosphite, distearylpentaerythritol diphosphite, tris(4-tert-butylphenyl)phosphite, tris(2,4-di-tert-butylphenyl)phosphite, a hydrogenated bisphenol A pentaerythritol phosphite polymer, bis(2,4-di-tert-butylphenyl)pentaerythritol diphosphite, bis(2,6-di-tert-butyl-4-methylphenyl)pentaerythritol diphosphite, 2,2'-methylenebis(4,6-di-tert-butylphenyl)octyl phosphite and bis(2,4-dicumylphenyl)pentaerythritol diphosphite. Among them, bis(2,6-di-tert-butyl-4-methylphenyl)pentaerythritol diphosphate is preferable.

The phosphate compound is preferably a compound represented by the following general formula:

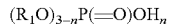

wherein $R_1$ represents an alkyl group or an aryl group and may be each the same or different; and n denotes an integer of 0 to 2.

More preferably, examples include a long-chain alkyl acid phosphate compound wherein $R_1$ has 8 to 30 carbon atoms. Specific examples of such an alkyl group having 8 to 30 carbon atoms include an octyl group, a 2-ethylhexyl group, an isooctyl group, a nonyl group, an isononyl group, a decyl group, an isodecyl group, a dodecyl group, a tridecyl group, an isotridecyl group, a tetradecyl group, a hexadecyl group, octadecyl group, an eicosyl group and a triacontyl group.

Examples of the long-chain alkyl acid phosphate include octyl acid phosphate, 2-ethylhexyl acid phosphate, decyl acid phosphate, lauryl acid phosphate, octadecyl acid phosphate, oleyl acid phosphate, behenyl acid phosphate, phenyl acid phosphate, nonylphenyl acid phosphate, cyclohexyl acid phosphate, phenoxyethyl acid phosphate, alkoxy polyethylene glycol acid phosphate, bisphenol A acid phosphate, dimethyl acid phosphate, diethyl acid phosphate, dipropyl acid phosphate, diisopropyl acid phosphate, dibutyl acid phosphate, dioctyl acid phosphate, di-2-ethylhexyl acid phosphate, dioctyl acid phosphate, dilauryl acid phosphate, distearyl acid phosphate, diphenyl acid phosphate and bisnonylphenyl acid phosphate.

Examples of the phosphonite compound preferably include a compound represented by the following general formula:

wherein each of $R_2$, $R_3$ and $R_4$ represents a hydrogen atom, an alkyl group having 1 to 30 carbon atoms or an aryl group having 6 to 30 carbon atoms, and at least one of $R_2$, $R_3$ and $R_4$ represents an aryl group having 6 to 30 carbon atoms.

Examples of the phosphonite compound include
tetrakis(2,4-di-iso-propylphenyl)-4,4'-biphenylene diphosphonite,
tetrakis(2,4-di-n-butylphenyl)-4,4'-biphenylene diphosphonite,
tetrakis(2,4-di-tert-butylphenyl)-4,4'-biphenylene diphosphonite,
tetrakis(2,4-di-tert-butylphenyl)-4,3'-biphenylene diphosphonite,
tetrakis(2,4-di-tert-butylphenyl)-3,3'-biphenylene diphosphonite,
tetrakis(2,6-di-iso-propylphenyl)-4,4'-biphenylene diphosphonite,
tetrakis(2,6-di-n-butylphenyl)-4,4'-biphenylene diphosphonite,
tetrakis(2,6-di-tert-butylphenyl)-4,4'-biphenylene diphosphonite,
tetrakis(2,6-di-tert-butylphenyl)-4,3'-biphenylene diphosphonite and
tetrakis(2,6-di-tert-butylphenyl)-3,3'-biphenylene diphosphonite.

A conventionally known any sulfur atom-containing compound can be used as the sulfur-based compound, and in particular, thioethers are preferable. Specific examples include didodecyl thiodipropionate, ditetradecyl thiodipropionate, dioctadecyl thiodipropionate, pentaerythritol tetrakis(3-dodecylthiopropionate), thiobis(N-phenyl-β-naphthyl amine), 2-mercaptobenzothiazole, 2-mercaptobenzimidazole, tetramethylthiuram monosulfide, tetramethylthiuram disulfide, nickel dibutyl dithiocarbamate, nickel isopropyl xanthate and trilauryl trithiophosphite. Among them, pentaerythritol tetrakis(3-dodecylthiopropionate) is preferable.

Examples of the phenol-based compound include
pentaerythritol tetrakis(3-(3,5-di-t-butyl-4-hydroxyphenyl) propionate), octadecyl-3-(3,5-di-tert-butyl-4-hydroxyphenyl)propionate,
thiodiethylene bis(3-(3,5-di-tert-butyl-4-hydroxyphenyl) propionate) and
pentaerythritol tetrakis(3-(3,5-di-neopentyl-4-hydroxyphenyl)propionate).

Although the detail reason why the polyester resin composition contains at least one compound selected from the group consisting of the phosphorus-based compound, the sulfur-based compound and the phenol-based compound to thereby have excellent heat resistance, mechanical properties and moldability is not clear, it is presumed as follows.

It is considered that the phosphorus-based compound, the sulfur compound or the phenol-based compound is added to the polyester resin, to thereby suppress thermal decomposition in kneading of the resin composition and thus suppress generation of a low molecular weight component. It is thus presumed that burr of a molded article is decreased. It is also presumed that the variation in density and the variation in the degree of crystallization of the resin are reduced and thus warpage of a molded article is decreased. The effect of decreasing warpage of a molded article is an extremely unexpected effect because it is also unclear how the phosphorus-based compound, the sulfur compound or the phenol-based compound acts.

The content of at least one compound selected from the group consisting of the phosphorus-based compound, the sulfur-based compound and the phenol-based compound in the polyester resin composition is usually 0.01 parts by weight or more, preferably 0.05 parts by weight or more, more preferably 0.1 parts by weight or more based on 100 parts by weight of the polyester resin, and on the other hand, the upper limit thereof is usually 5 parts by weight or less, preferably 3 parts by weight or less, more preferably 1 part by weight or less. When the content falls within the above ranges, heat stability tends to be enhanced and also burr and warpage tend to hardly occur in molding.

(Epoxy-Based Compound, Isocyanate-Based Compound and Carbodiimide-Based Compound)

The polyester resin composition preferably contains at least one compound selected from the group consisting of an epoxy-based compound, an isocyanate-based compound and a carbodiimide-based compound. The polyester resin composition contains such a compound, and thus has excellent heat resistance, residence heat stability and mechanical properties.

The epoxy-based compound is not particularly limited as long as it is a compound having an epoxy group. The functional group in the epoxy-based compound may have monofunctionality, or di- or higher functionality, and a di- or higher functional epoxy-based compound is preferable and an epoxy-based compound having two or more epoxy groups in one molecule is more preferable from the viewpoint of enhancing residence heat stability.

Examples of the epoxy-based compound include glycidyl ethers such as methyl glycidyl ether, butyl glycidyl ether, 2-ethylhexyl glycidyl ether, decyl glycidyl ether, stearyl glycidyl ether, phenyl glycidyl ether, butylphenyl glycidyl ether and allyl glycidyl ether; diglycidyl ethers such as bisphenol A diglycidyl ether, neopentyl glycol diglycidyl ether, ethylene glycol diglycidyl ether, glycerin diglycidyl ether and propylene glycol diglycidyl ether; glycidyl esters such as benzoic acid glycidyl ester and sorbic acid glycidyl ester, diglycidyl esters such as adipic acid diglycidyl ester, terephthalic acid diglycidyl ester and orthophthalic acid diglycidyl ester; alicyclic diepoxy-based compounds such as 3,4-epoxycyclohexylmethyl-3',4'-epoxycyclohexyl carboxylate; glycidylimide compounds such as N-glycidylphthalimide; and novolac-type epoxy-based compounds such as phenol novolac and cresol novolac.

Among them, a phenol novolac-type epoxy-based compound is preferable which is a polyfunctional epoxy-based compound obtained by a reaction of phenol novolac and epichlorohydrin.

The epoxy equivalent in the epoxy-based compound is not particularly limited, and it is usually 50 to 5000 g/eq, preferably 100 to 1000 g/eq, more preferably 120 to 250 g/eq.

<Isocyanate-Based Compound>

The isocyanate-based compound is not particularly limited as long as it is a compound having an isocyanate group. The functional group in the isocyanate-based compound may have monofunctionality, or di- or higher functionality, and a di- or higher functional isocyanate-based compound is preferable and a compound having two or more isocyanate groups in one molecule is more preferable from the viewpoint of enhancing residence heat stability.

Examples of the isocyanate-based compound include monoisocyanate compounds such as methyl isocyanate; and diisocyanate compounds such as 2,4-tolylene diisocyanate, a mixture of 2,4-tolylene diisocyanate and 2,6-tolylene diisocyanate, diphenylmethane diisocyanate, 1,5-naphthylene diisocyanate, xylylene diisocyanate, hydrogenated xylylene diisocyanate, hexamethylene diisocyanate and isophorone diisocyanate.

Preferably, diphenylmethane diisocyanate is used in terms of residence heat stability of the resin composition.

<Carbodiimide-Based Compound>

The carbodiimide-based compound is a compound (including a polycarbodiimide compound) having at least one carbodiimide group in the molecule. The functional group in the carbodiimide-based compound may have monofunctionality, or di- or higher functionality.

Examples of the carbodiimide-based compound include dicyclohexylcarbodiimide, diisopropylcarbodiimide, dimethylcarbodiimide, diisobutylcarbodiimide, dioctylcarbodiimide, t-butylisopropylcarbodiimide, diphenylcarbodiimide, di-t-butylcarbodiimide, di-β-naphthyl carbodiimide, N,N'-di-2,6-diisopropylphenylcarbodiimide and carbodiimide-modified isocyanate, and among them, carbodiimide-modified isocyanate is preferable.

Although the detail reason why the polyester resin composition contains at least one compound selected from the group consisting of the epoxy-based compound, the isocyanate-based compound and the carbodiimide-based compound to thereby have excellent heat resistance, residence heat stability and mechanical properties is not clear, it is presumed as follows.

A polyester resin including a 2,5-furandicarboxylic acid unit and an alicyclic diol unit as main constituent units is remarkably low in residence heat stability. It is, however, presumed from the following reason that residence heat stability is enhanced by use of the epoxy-based compound, the carbodiimide-based compound and/or the isocyanate-based compound.

It is considered that, when the epoxy-based compound, the carbodiimide-based compound and the isocyanate-based compound are monofunctional compounds, residence heat stability is enhanced by blocking a terminal carboxylic acid group serving as the origin of point of decomposition.

It is also considered that, when the epoxy-based compound, the carbodiimide-based compound and the isocyanate-based compound are polyfunctional compounds, such compounds promote a chain extension or crosslinking reaction of a polyester molecular chain generated by decomposition during residence of heat and allow re-binding to occur, thereby resulting in a significant enhancement in residence heat stability.

While a polyfunctional compound is generally a compound for use in chain extension of a low molecular weight polymer, and, after added to a common high molecular weight polymer and then heated, the compound may cause an increase in molecular weight and gelation, it is considered that the polyester resin is extremely low in residence heat stability and equilibrates between thermal decomposition and a chain extension reaction with the compound, thereby allowing the above effect to be achieved.

That is, it is considered that an epoxy-based compound, a carbodiimide-based compound or an isocyanate-based compound which is a compound having reactivity at the same level as in the thermal decomposition rate is used, to thereby enhance residence heat stability with gelation in melt-kneading being suppressed.

The content of the epoxy-based compound, the carbodiimide-based compound and/or the isocyanate-based compound in the resin composition is usually 0.1 parts by weight or more, preferably 0.3 parts by weight or more, more preferably 0.5 parts by weight or more based on 100 parts by weight of the polyester resin, and on the other hand, the upper limit thereof is usually 5 parts by weight or less, preferably 3 parts by weight or less, more preferably 2 parts by weight or less. When the content of the above compound(s) in the resin composition falls within the above ranges, residence heat stability tends to be enhanced.

<Crystal Nucleating Agent>

While a polyester resin according to an embodiment of the present invention is excellent in crystallinity, a crystal nucleating agent may also be added thereto in order to further increase the degree of crystallization. As the crystal nucleating agent, talc, boron nitride, silica, layered silicate, polyethylene wax and polypropylene wax are preferable, and talc and polyethylene wax are further preferable. These may be used singly or as a mixture of two or more thereof. When the crystal nucleating agent is an inorganic material, the effect of the nucleating agent is more preferable as the particle size of the nucleating agent is smaller. A preferable average particle size of the crystal nucleating agent is preferably 5 µm or less, more preferably 3 µm or less, further preferably 1 µm or less, particular preferably 0.5 µm or less. Herein, the lower limit of the average particle size of the crystal nucleating agent is 0.1 µm.

A preferable amount of the crystal nucleating agent to be added to the polyester resin is preferably 0.001% by weight or more, more preferably 0.01% by weight or more, further preferably 0.1% by weight or more. In addition, the amount of the crystal nucleating agent to be added is preferably 30% by weight or less, more preferably 10% by weight or less, further preferably 5% by weight or less, particular preferably 1% by weight or less. When the amount of the crystal nucleating agent to be added is the lower limit value or more, the effect of crystallization promotion due to addition of the crystal nucleating agent tends to be sufficiently achieved, and when the amount is the upper limit value or less, the resulting polyester resin tends to achieve characteristics such as mechanical properties and flexibility.

Herein, even when the nucleating agent is added not for the purpose of exhibiting the function thereof, the nucleating agent may act for the purpose of exhibiting other effects, for example, a function effect as an inorganic filler to be added for an improvement in rigidity and a function effect as an organic stabilizer to be added as a heat stabilizer, or a foreign substance such as an inorganic substance or an organic substance incorporated in a production process or molding process of a resin also serves as a crystal nucleating agent. Accordingly, the crystal nucleating agent herein refers to all inorganic substances and organic substances which are solids at normal temperature.

<Application of Polyester Resin (Resin Composition)>

The polyester resin and the polyester resin composition can be subjected to molding according to various molding methods applied to general-purpose plastics.

Examples of such a molding method include compression molding (compression molding, lamination molding, stampable molding), injection molding, extrusion and co-extrusion molding (film forming, laminate forming, pipe forming, wire/cable forming and profile forming by an inflation method or a T-die method), hollow molding (various blow moldings), calender molding, foam molding (melt foam molding, solid-phase foam molding), solid forming (uniaxial stretching molding, biaxial stretching molding, rolling molding, stretched oriented nonwoven fabric forming, thermoforming (vacuum forming, compressed air forming), plastic forming), powder molding (rotation molding) and various unwoven fabric formings (dry method, adhesion method, entangling method, spunbond method, and the like).

The polyester resin and the polyester resin composition are particularly preferably applied to an injection-molded article, an extruded article, a foam-molded article or a hollow-molded article, and specifically, are preferably applied to various parts in the electrical and electronic fields and parts for automobiles, films, containers, and fibers.

Such a molded product can also be subjected to various purposeful secondary processings for the purpose of imparting surface functions such as a chemical function, an electrical function, a magnetic function, a mechanical function, a frication/abrasion/lubrication function, an optical function and a thermal function. Examples of the secondary processing include embossing, painting, adhesion, printing, metalizing (plating or the like), mechanical processing, and surface treatments (antistatic treatment, corona discharge treatment, plasma treatment, photochromism treatment, physical vapor deposition, chemical vapor deposition, coating, and the like).

In particular, such a molded article is suitable for use in various film applications and injection-molded product applications.

EXAMPLES

Hereinafter, the present invention will be more specifically described with reference to Examples, but the present invention is not intended to be limited to these Examples as long as it does not depart from the gist thereof.

Herein, measurement methods of various physical properties and evaluation methods of molded articles in Examples A and Comparative Examples A are as follows.

[Reduced Viscosity ($\eta$sp/c)]

The reduced viscosity was determined from the solution viscosity obtained by subjecting a solution of a polyester resin obtained in each of Examples and Comparative Examples in phenol/1,1,2,2-tetrachloroethane (1:1 weight ratio), having a concentration of 0.5 g/dL, to measurement at 30° C.

[DSC Measurement]

The measurement apparatus used was DSC 6100 manufactured by SII Nanotechnology Inc. The sample used was a pellet obtained by cooling and cutting immediately after extraction after melt polymerization, or a pellet after solid phase polymerization. 5 to 7 mg of the sample was precisely weighed, heated from 30° C. to 300° C. at a rate of 10° C./min, and thereafter cooled to 30° C. and heated again to 300° C. The temperature of the maximum endothermic peak observed in the second heating was defined as the melting point Tm, the temperature of the exothermic peak observed in the cooling was defined as the cooling crystallization temperature Tmc, and the respective temperatures of the peak tops were read.

[Carboxylic Acid Terminal]

The polyester resin obtained in each Examples and Comparative Examples was precisely weighed in an amount of 0.4 to 0.5 g, 25 mL of benzyl alcohol was added thereto, and the resultant was stirred at 195° C. for 9 minutes and completely dissolved. After dissolution, the solution was cooled in an ice bath. After cooling, 2 mL of ethanol was added thereto, and titration was made using a 0.01 N NaOH benzyl alcohol solution by an automatic titration apparatus "GT100" manufactured by Mitsubishi Chemical Corporation (the amount of titration was defined as A (ml).). Next, the same measurement was performed using only benzyl alcohol, to determine the blank value (B (ml)), and calculation with respect to the carboxylic acid terminal was made according to the following expression.

Carboxylic acid terminal $(\mu eq/g) = (A-B) \times F \times 10/W$

A (ml): Amount of titration measured
B (ml): Amount of titration of blank
F: Factor of 0.01N NaOH benzyl alcohol solution
W (g): Sample weight

[Sum (Vinyl Terminal Concentration) of Cyclovinylidene Terminal Represented by Formula (1) and Methylcyclohexene Terminal Represented by Formula (2)]

The sample was dissolved in a mixed solvent of hexafluoroisopropanol-d2/deuterated chloroform (weight ratio: 1/5), and subjected to $^1$H-NMR measurement using 400 MHz NMR manufactured by Brucker Japan K.K. The cyclovinylidene terminal represented by formula (1) was subjected to determination based on the peak at 4.6 to 4.7 ppm, and the methylcyclohexene terminal represented by formula (2) was subjected to determination based on the peak at 5.3 to 5.4 ppm. In addition, pyridine-d5 or Pr[fod]$_3$ was used as a shifting agent.

[Number Average Molecular Weight (Mn) and Weight Average Molecular Weight (Mw)]

The number average molecular weight (Mn) and the weight average molecular weight (Mw) were measured by performing GPC measurement according to the following measurement equipment and measurement conditions.

Measurement equipment: Tosoh HLC-8220 GPC (L)
Detector: RI
Mobile phase: hexafluoroisopropanol
(5 mM of sodium trifluoroacetate added)
Flow rate: 0.2 ml/min
Injection: 0.1% by weight×10 µL
Column: Tosoh TSKgel GMHhr-M
Column temperature: 40° C.
Calibration method: PMMA conversion

[Solid Phase Polymerization Rate]

The pellet after completion of melt polymerization was placed in a vacuum oven (about 130 Pa) at 240° C. and treated for 6 hours, and the ηsp/c after solid phase polymerization was measured.

The value obtained by dividing (ηsp/c after solid phase polymerization)−(ηsp/c after melt polymerization) by the solid phase polymerization reaction time (6 hours) was represented as the solid phase polymerization rate (Δ (ηsp/c)/hr).

[Melt Stability Test]

The resulting polyester resin was heat-treated for 30 minutes by use of a Flowtester CFT-500 manufactured by Shimadzu Corporation which was heated to 290° C. The ηsp/c and the carboxylic acid terminal after the heat treatment were measured.

[Injection Molding]

The resulting polyester resin was injection-molded by use of a micro-injection molding machine (10 cc) manufactured by DSM Xplore, thereby producing a bending test piece. The barrel set temperature was 290° C., and the mold temperature was 80° C. Furthermore, the bending test piece produced was annealed at 150° C. for 8 hours.

[Bending Test]

The test piece obtained by the above injection molding was used to perform a bending test by a method according to ISO 178.

[Press Molding]

A sheet of 5 cm×5 cm×1 mm in thickness was formed from the resulting polyester resin by use of a small-sized press machine manufactured by Imoto Machinery Co., Ltd. The press temperature was 290° C. Cooling was performed by the same type of press machine at 80° C.

[Haze Measurement]

The press sheet obtained above was subjected to haze measurement with a haze computer manufactured by Suga Test Instruments Co., Ltd.

[Dynamic Viscoelasticity Measurement]

The press sheet obtained above was cut to a width of 6 mm, and subjected to a dynamic viscoelasticity test by use of DMS 6100 manufactured by SII Nanotechnology Inc. The measurement mode was a tensile mode, the measurement frequency was 10 Hz, and the distance between chucks was 20 mm. The temperature condition was as follows: from 30° C. to 200° C. at a rate of 2° C./min. The heat resistance was determined from the storage elastic modulus (E'30) at 30° C. and the storage elastic modulus (E'90) at 90° C. The heat resistance was also determined from the rate of elongation of the sample sheet at the time point where the temperature reached 180° C.

Example A1

Into a reaction vessel equipped with a stirring apparatus, a nitrogen introduction port, a heating apparatus, a thermometer and a pressure reduction port were loaded, as raw materials, 69.7 parts by weight of dimethyl 2,5-furandicarboxylate, 60.0 parts by weight of 1,4-cyclohexanedimethanol (cis/trans ratio=29/71) and 0.36 parts by weight of a toluene solution where 2% by weight of titanium tetrabutylate was dissolved in advance, and a nitrogen atmosphere was made by repeating introduction of a nitrogen gas and pressure reduction.

Next, the reaction vessel was loaded into an oil bath at 160° C. and stirring was started. A distillate generated by a reaction was started to remain in a trap after a lapse of about 30 minutes, and the temperature was raised to 275° C. over 2 hours and 30 minutes and the reaction was allowed to run at that temperature for 30 minutes to perform a transesterification reaction. Next, 0.28 parts by weight of a 1,4-butanediol solution where 10% by weight of titanium tetrabutylate was dissolved in advance was added, subsequently pressure reduction was gradually made over 1 hour and 30 minutes so that the pressure was 130 Pa or less, and an increase in stirring torque was stopped after a lapse of 6 hours from the start of the pressure reduction and therefore a polycondensation reaction was terminated, thereby providing polyester resin A1. The evaluation results of polyester resin A1 obtained were represented in Table 1.

Example A2

Into a reaction vessel equipped with a stirring apparatus, a nitrogen introduction port, a heating apparatus, a thermometer and a pressure reduction port were loaded, as raw materials, 69.7 parts by weight of dimethyl 2,5-furandicarboxylate, 55.7 parts by weight of 1,4-cyclohexanedimethanol (cis/trans ratio=29/71) and 0.53 parts by weight of a 1,4-butanediol solution where 4% by weight of titanium tetrabutylate was dissolved in advance, and a nitrogen atmosphere was made by repeating introduction of a nitrogen gas and pressure reduction.

Next, the reaction vessel was loaded into an oil bath at 160° C. and stirring was started. A distillate generated by a reaction was started to remain in a trap after a lapse of about 20 minutes, and the temperature was raised to 275° C. over 2 hours and 30 minutes and the reaction was allowed to run at that temperature for 30 minutes to perform a transesterification reaction. Subsequently, pressure reduction was gradually made over 1 hour and 30 minutes so that the pressure was 130 Pa or less, and an increase in stirring torque was stopped after a lapse of 2 hours and 25 minutes from the start of the pressure reduction and therefore a polycondensation reaction was terminated, thereby providing polyester resin A2. The evaluation results of polyester resin A2 obtained were represented in Table 1.

Example A3

Into a reaction vessel equipped with a stirring apparatus, a nitrogen introduction port, a heating apparatus, a thermometer and a pressure reduction port were loaded, as raw materials, 69.7 parts by weight of dimethyl 2,5-furandicarboxylate, 65.5 parts by weight of 1,4-cyclohexanedimethanol (cis/trans ratio=27/73) and 0.12 parts by weight of a 1,4-butanediol solution where 6% by weight of titanium tetrabutylate was dissolved in advance, and a nitrogen atmosphere was made by repeating introduction of a nitrogen gas and pressure reduction.

Next, the reaction vessel was loaded into an oil bath at 120° C., stirring was started, and the temperature was raised to 280° C. over 2 hours. On the way, when the temperature reached around 250° C., 0.24 parts by weight of a 1,4-butanediol solution where 6% by weight of titanium tetrabutylate was dissolved in advance was added. After the temperature reached 280° C., a reaction was allowed to run for 30 minutes to perform a transesterification reaction. Pressure reduction was gradually made over 1 hour and 30 minutes, with the temperature being kept at 280° C., so that the pressure was 130 Pa or less, and an increase in stirring torque was stopped after a lapse of 4 hours and 30 minutes from the start of the pressure reduction and therefore a polycondensation reaction was terminated, thereby providing polyester resin A3. The evaluation results of polyester resin A3 obtained were represented in Table 1.

Example A4

The same production as in Example A3 was conducted except that 69.7 parts by weight of dimethyl 2,5-furandicarboxylate, 60.0 parts by weight of 1,4-cyclohexanedimethanol (cis/trans ratio=27/73), and 0.01 parts by weight of ORGATICS TC-1040, as a titanium catalyst, manufactured by Matsumoto Fine Chemical Co. Ltd. and 0.02 parts by weight thereof at the time point where the temperature reached 250° C. were loaded as raw materials into a reaction vessel equipped with a stirring apparatus, a nitrogen introduction port, a heating apparatus, a thermometer and a pressure reduction port. A polycondensation reaction was terminated after a lapse of 4 hours and 25 minutes from the start of the pressure reduction, thereby providing polyester resin A4. The evaluation results of polyester resin A4 obtained were represented in Table 1.

Example A5

The same production as in Example A3 was conducted except that 69.7 parts by weight of dimethyl 2,5-furandicarboxylate and 60.0 parts by weight of 1,4-cyclohexanedimethanol (cis/trans ratio=27/73) were loaded as raw materials and the final reaching temperature was 290° C. An increase in stirring torque was stopped after a lapse of 2 hours and 40 minutes from the start of the pressure reduction and therefore a polycondensation reaction was terminated, thereby providing polyester resin A5. The evaluation results of polyester resin A5 obtained were represented in Table 1.

Example A6

Loaded were 69.0 parts by weight of dimethyl 2,5-furandicarboxylate, 0.7 parts by weight of dimethyl terephthalate, 56.2 parts by weight of 1,4-cyclohexanedimethanol (cis/trans ratio=29/71) and 0.18 parts by weight of a toluene solution where 2% by weight of titanium tetrabutylate was dissolved in advance, as raw materials, and the same reaction as in Example 1 was allowed to run. Added was 0.24 parts by weight of a 1,4-butanediol solution where 6% by weight of titanium tetrabutylate was dissolved in advance, at the time point where the temperature reached 275° C.

A polycondensation reaction was terminated after a lapse of 3 hours and 30 minutes from the start of the pressure reduction, thereby providing polyester resin A6. The evaluation results of polyester resin A6 obtained were represented in Table 1.

Example A7

Into a reaction vessel equipped with a stirring apparatus, a nitrogen introduction port, a heating apparatus, a thermometer and a pressure reduction port were loaded, as raw materials, 15.6 parts by weight of 2,5-furandicarboxylic acid, 15.8 parts by weight of 1,4-cyclohexanedimethanol (cis/trans ratio=29/71) and 0.13 parts by weight of an ethylene glycol solution where 6% by weight of titanium tetraisopropoxide was dissolved in advance, and a nitrogen atmosphere was made by repeating introduction of a nitrogen gas and pressure reduction.

Next, the reaction vessel was loaded into an aluminum block heater at 200° C. and stirring was started, to allow a reaction to run at 200° C. for about 1 hour and 30 minutes. Thereafter, the temperature was raised to 280° C. over 15 minutes and left for about 25 minutes, to perform an esterification reaction. Pressure reduction was gradually made over 1 hour and 30 minutes, with the temperature being kept at 280° C., so that the pressure was 130 Pa or less, and an increase in stirring torque was stopped after a lapse of 4 hours and 15 minutes from the start of the pressure reduction and therefore a polycondensation reaction was terminated, thereby providing polyester resin A7. The evaluation results of polyester resin A7 obtained were represented in Table 1.

Example A8

Into a reaction vessel equipped with a stirring apparatus, a nitrogen introduction port, a heating apparatus, a thermometer and a pressure reduction port were loaded, as raw materials, 59.1 parts by weight of 2,5-furandicarboxylic acid, 57.3 parts by weight of 1,4-cyclohexanedimethanol (cis/trans ratio=27/73), 0.42 parts by weight of a 1,4-butanediol solution where 6% by weight of titanium tetrabutylate was dissolved in advance, and 0.2 parts by weight of Irganox 1330, and a nitrogen atmosphere was made by repeating introduction of a nitrogen gas and pressure reduction.

Next, the reaction vessel was loaded into an oil bath at 185° C. and stirring was started. After a lapse of about 30 minutes, the temperature was raised to 280° C. over 2 hours, to perform an esterification reaction. Next, pressure reduction was gradually made over 1 hour and 30 minutes so that the pressure was 130 Pa or less, and an increase in stirring torque was stopped after a lapse of 2 hours and 45 minutes from the start of the pressure reduction and therefore a polycondensation reaction was terminated, thereby providing polyester resin A8. The evaluation results of polyester resin A8 obtained were represented in Table 1.

Comparative Example A1

The same manner as in Example A1 was performed except that the polycondensation reaction temperature was changed to 290° C. An increase in stirring torque was stopped after a lapse of 2 hours and 30 minutes from the start of the pressure reduction and therefore a polycondensation reaction was terminated, thereby providing polyester resin A9. The evaluation results of polyester resin A9 obtained were represented in Table 1.

Comparative Example A2

The same production as in Example A3 was conducted except that 69.7 parts by weight of dimethyl 2,5-furandicarboxylate and 70.9 parts by weight of 1,4-cyclohexanedimethanol (cis/trans ratio=27/73) were loaded as raw materials. A polycondensation reaction was terminated after a lapse of 4 hours and 45 minutes from the start of the pressure reduction, thereby providing polyester resin A10. The evaluation results of polyester resin A10 obtained were represented in Table 1.

Comparative Example A3

The same production as in Example A6 was conducted except that the final reaching temperature was 293° C. An increase in stirring torque was stopped after a lapse of 2 hours and 10 minutes from the start of the pressure reduction and therefore a polycondensation reaction was terminated, thereby providing polyester resin A11. The evaluation results of polyester resin A11 obtained were represented in Table 1.

Comparative Example A4

Into a reaction vessel equipped with a stirring apparatus, a nitrogen introduction port, a heating apparatus, a thermometer and a pressure reduction port were loaded, as raw materials, 15.7 parts by weight of 2,5-furandicarboxylic acid, 15.1 parts by weight of 1,4-cyclohexanedimethanol (cis/trans ratio=29/71) and 0.079 parts by weight of an ethylene glycol solution where 10% by weight of titanium tetraisopropoxide was dissolved in advance, and a nitrogen atmosphere was made by repeating introduction of a nitrogen gas and pressure reduction.

Next, the reaction vessel was loaded into an aluminum block heater at 200° C. and stirring was started, to allow a reaction to run at 200° C. for about 40 minutes. Thereafter, the temperature was raised to 285° C. over 15 minutes and left for about 20 minutes, to perform an esterification reaction. Pressure reduction was gradually made over 1 hour and 30 minutes, with the temperature being kept at 285° C., so that the pressure was 130 Pa or less, and an increase in stirring torque was stopped after a lapse of 1 hour and 35 minutes from the start of the pressure reduction and therefore a polycondensation reaction was terminated, thereby providing polyester resin A12. The evaluation results of polyester resin A12 obtained were represented in Table 1.

TABLE 1

| | Polymerization temperature (° C.) | ηsp/c (dL/g) | Vinyl (μeq/g) | AV (μeq/g) | DSC Tm (° C.) | Tmc (° C.) | Tm − Tmc (° C.) |
|---|---|---|---|---|---|---|---|
| Example A1 | 275 | 0.788 | 53 | 8 | 270 | 230 | 40 |
| Example A2 | 275 | 0.84 | 36 | 9 | 269 | 224 | 45 |
| Example A3 | 280 | 0.826 | 53 | 10 | 272 | 236 | 36 |
| Example A4 | 280 | 0.704 | 59 | 12 | 272 | 236 | 36 |
| Example A5 | 290 | 0.769 | 75 | 22 | 271 | 232 | 39 |
| Example A6 | 275 | 0.825 | 52 | 13 | 269 | 228 | 41 |
| Example A7 | 280 | 0777 | 49 | 4 | 268 | 228 | 40 |
| Example A8 | 280 | 0.76 | 56 | 6 | 271 | 235 | 36 |
| Comparative Example A1 | 290 | 0.642 | 88 | 22 | 269 | 210 | 59 |
| Comparative Example A2 | 280 | 0.666 | 36 | 7 | 273 | 232 | 41 |
| Comparative Example A3 | 293 | 0.751 | 86 | 32 | 271 | 219 | 52 |
| Comparative Example A4 | 285 | 0.632 | 90 | 19 | 266 | 200 | 66 |

| | Melt stability test | | Bending test | | Appearance of molded piece Haze (%) | Viscoelasticity measurement | | |
|---|---|---|---|---|---|---|---|---|
| | ηsp/c (dL/g) | AV (μeq/g) | Bending strength (MPa) | Bending elastic modulus (MPa) | Amount of bending displacement (mm) | E' at 30° C. (MPa) | E' at 90° C. (MPa) | Rate of elongation at 180° C. |
| Example A1 | 0.555 | 48 | 110 | 2260 | 9.7 | 93 | 2600 | 280 | 0.8% |
| Example A2 | 0.569 | 51 | — | — | — | 39 | 2500 | 120 | 8.0% |

TABLE 1-continued

| | | | | | | | | | |
|---|---|---|---|---|---|---|---|---|---|
| Example A3 | 0.560 | 48 | 91 | 2320 | 6.6 | 96 | 2800 | 1600 | 0.4% |
| Example A4 | 0.510 | 58 | 67 | 2290 | 4.5 | 96 | 2900 | 1600 | 0.8% |
| Example A5 | 0.536 | 66 | 98 | 2220 | 7.3 | 66 | 2400 | 160 | 4.6% |
| Example A6 | — | — | — | — | — | — | — | — | — |
| Example A7 | 0.520 | 56 | — | — | — | 96 | 2800 | 700 | 0.2% |
| Example A8 | 0.522 | 49 | 70 | 2320 | 4.7 | 96 | 2900 | 1700 | 0.7% |
| Comparative Example A1 | 0.517 | 73 | 60 | 2120 | 4.1 | 13 | 2100 | 89 | 7.3% |
| Comparative Example A2 | 0.471 | 54 | 57 | 2200 | 3.8 | 91 | 2500 | 140 | 5.2% |
| Comparative Example A3 | 0.516 | 78 | 81 | 2270 | 5.6 | 12 | 2600 | 89 | 10.2% |
| Comparative Example A4 | 0.459 | 72 | — | — | — | 11 | 2500 | 49 | 14.0% |

Example A9 and Comparative Example A5

In a vacuum oven heated to 240° C. was placed 2 g of a pellet of each of the polyester resins obtained in Example A2 and Comparative Example A1, and treated under vacuum for 6 hours, to perform a solid phase polymerization reaction. The respective resultants were defined as Example A9 (polyester resin A13) and Comparative Example A5 (polyester resin A14). The evaluation results of polyester resins A13 and A14 after solid phase polymerization were represented in Table 2.

measurement. In addition, it is indicated by viscoelasticity measurement that, when the degree of crystallization is low, a reduction in elastic modulus at high temperatures is increased. Similarly, when the degree of crystallization is low, there tends to be any concern about heat resistance, for example, an increase in the elongation of a sample at elevated temperatures.

It is shown from Example A9 and Comparative Example A5 that, when the vinyl terminal concentration is high, the solid phase polymerization rate is decreased. It is also shown therefrom that the vinyl terminal concentration and the

TABLE 2

| | | $\eta sp/c$ (dL/g) | Vinyl ($\mu eq/g$) | AV ($\mu eq/g$) | Mn | Mw | DSC Tm (° C.) | DSC Tmc (° C.) | DSC Tm – Tmc (° C.) | Solid phase polymerization rate $\Delta$ ($\eta sp/c$)/hr |
|---|---|---|---|---|---|---|---|---|---|---|
| Example A2 | Before solid phase polymerization | 0.84 | 36 | 9 | 42000 | 78900 | 269 | 224 | 45 | 0.043 |
| Example A9 | After solid phase polymerization | 1.098 | 38 | 5 | 47000 | 94500 | 269 | 227 | 42 | |
| Comparative Example A1 | Before solid phase polymerization | 0.642 | 88 | 22 | 36000 | 65900 | 269 | 210 | 59 | 0.033 |
| Comparative Example A5 | After solid phase polymerization | 0.84 | 84 | 10 | — | — | 269 | 213 | 56 | |

As shown in Examples A1 to A8 and Comparative Examples A1 to A4, when the polycondensation reaction temperature of melt polymerization is high, the concentrations of the carboxylic acid terminal and the vinyl terminal tend to be increased, resulting in a reduction in crystallization temperature (Tmc).

When the carboxylic acid terminal concentration is high, hydrolysis resistance tends to be deteriorated.

When the vinyl terminal concentration is high, the molecular weight tends not to be sufficiently increased. In addition, when the vinyl terminal concentration is high, a reduction in η and an increase in the carboxylic acid terminal after the melt stability test tend to be promoted, and any problem about melt stability can be caused.

When the molecular weight is not sufficiently increased (lower ηsp/c), reductions in the bending strength and the amount of bending displacement are exhibited.

When the crystallization temperature is low, a molded piece low in the degree of crystallization tends to be obtained, and in this case an increase in the degree of transparency of a press-molded piece is indicated by haze crystallization temperature (Tmc) after solid phase polymerization are not almost different from those before solid phase polymerization.

Example A10

Into a reaction vessel equipped with a stirring apparatus, a nitrogen introduction port, a heating apparatus, a thermometer and a pressure reduction port were loaded, as raw materials, 69.7 parts by weight of dimethyl 2,5-furandicarboxylate, 60.0 parts by weight of 1,4-cyclohexanedimethanol (cis/trans ratio=30/70), 0.12 parts by weight of a 1,4-butanediol solution where 6% by weight of titanium tetrabutylate was dissolved in advance, and sodium hydrogen carbonate so that the ratio of sodium to a polymer produced was 15 ppm, and a nitrogen atmosphere was made by repeating introduction of a nitrogen gas and pressure reduction.

Next, the reaction vessel was loaded into an oil bath at 120° C., stirring was started, and the temperature was raised to 280° C. over 2 hours. On the way, when the temperature reached around 250° C., 0.24 parts by weight of a 1,4-butanediol solution where 6% by weight of titanium tetrabutylate was dissolved in advance was added. After the temperature reached 280° C., a reaction was allowed to run for 15 minutes to perform a transesterification reaction. Pressure reduction was gradually made over 1 hour and 30 minutes, with the temperature being kept at 280° C., so that the pressure was 130 Pa or less, and an increase in stirring torque was stopped after a lapse of 3 hours and 45 minutes from the start of the pressure reduction and therefore a polycondensation reaction was terminated, thereby providing polyester resin A15. Polyester resin A15 obtained was subjected to a melt heat stability test at 290° C. The evaluation results were represented in Table 3.

Example A11

The same manner as in Example A10 was performed except that sodium hydrogen carbonate was loaded so that the ratio of sodium to a polymer produced was 30 ppm. A polycondensation reaction was terminated after a lapse of 4 hours and 5 minutes from the start of the pressure reduction, thereby providing polyester resin A16. Polyester resin A16 obtained was subjected to a melt heat stability test at 290° C. The evaluation results were represented in Table 3.

Example A12

Into a reaction vessel equipped with a stirring apparatus, a nitrogen introduction port, a heating apparatus, a thermometer and a pressure reduction port were loaded, as raw materials, 87.6 parts by weight of dimethyl 2,5-furandicarboxylate, 66.4 parts by weight of 1,4-butanediol, 2.2 parts by weight of a 1,4-butanediol solution where 2% by weight of titanium tetraisopropoxide was dissolved in advance, and sodium hydrogen carbonate so that the ratio of sodium to a polymer produced was 15 ppm, and a nitrogen atmosphere was made by repeating introduction of a nitrogen gas and pressure reduction.

Next, the reaction vessel was loaded into an oil bath at 160° C., stirring was started to allow a reaction to run for 180 minutes, and thereafter the temperature was raised to 240° C. over 2 hours. Pressure reduction was started after 30 minutes from the start of temperature rise, such pressure reduction was gradually made over 1 hour and 30 minutes so that the pressure was 130 Pa or less, and a polycondensation reaction was terminated after a lapse of 2 hours and 15 minutes from the start of the pressure reduction, thereby providing polyester resin A17. Polyester resin A17 obtained was subjected to a melt heat stability test at 240° C. The evaluation results were represented in Table 3.

Comparative Example A6

The same manner as in Example A12 was performed except that no sodium hydrogen carbonate was loaded. A polycondensation reaction was terminated after a lapse of 2 hours and 42 minutes from the start of the pressure reduction, thereby providing polyester resin A18. Polyester resin A18 obtained was subjected to a melt heat stability test at 240° C. The evaluation results were represented in Table 3.

TABLE 3

|  | Polymerization temperature (° C.) | Amount of alkali metal added | ηsp/c (dL/g) | Vinyl (μeq/g) | AV (μeq/g) | Melt stability at 290° C. and 30 min | |
|---|---|---|---|---|---|---|---|
|  |  |  |  |  |  | ηsp/c (dL/g) | AV (μeq/g) |
| Example A10 | 280 | Na 15 ppm | 0.887 | 43 | 7 | 0.614 | 36 |
| Example A11 | 280 | Na 30 ppm | 0.76 | 38 | 6 | 0.554 | 33 |
| Example A3 | 280 | None | 0.826 | 53 | 10 | 0.560 | 48 |
|  | Polymerization temperature (° C.) | Amount of alkali metal added | ηsp/c (dL/g) | AV (μeq/g) |  | Melt stability at 240° C. and 30 min | |
|  |  |  |  |  |  | ηsp/c (dL/g) | AV (μeq/g) |
| Example A12 | 240 | Na 15 ppm | 1.452 | 51 |  | 1.249 | 67 |
| Comparative Example A6 | 240 | None | 1.371 | 69 |  | 1.058 | 112 |

It is shown in Table 3 that, when the alkali metal is added for polymerization, the carboxylic acid terminal concentration in the resulting polyester resin is decreased and melt heat stability is enhanced.

Next, raw materials and evaluation methods for use in Example B are represented.

<Raw Materials>

[Resin]

The followings were each used as a resin (product reinforced by GF at 30%) where 43 parts by weight of a glass fiber was compounded based on 100 parts by weight of a base resin.

Resin B1; described in Production Example below

Resin B2: polybutylene terephthalate (product reinforced by glass fiber at 30%); Novaduran 5010G30 manufactured by Mitsubishi Engineering-Plastics Corporation Resin B3: syndiotactic polystyrene (product reinforced by glass fiber at 30%); XAREC C132S manufactured by Idemitsu Kosan Co., Ltd.

Resin B4: polyphenylene sulfide (product reinforced by glass fiber at 30%); Durafide 1130A1 manufactured by Polyplastics Co., Ltd.

Resin B5: polycyclohexylenedimethylene terephthalate (product reinforced by glass fiber at 30%); Thermix TXCG033 manufactured by Celanese Corporation The followings were each used as a resin including no glass fiber.

Resin B6: polybutylene terephthalate; Novaduran 5010R5 manufactured by Mitsubishi Engineering-Plastics Corporation Resin B7: syndiotactic polystyrene; XAREC S100 manufactured by Idemitsu Kosan Co., Ltd.

Resin B8: polyphenylene sulfide; Durafide 0220C9 manufactured by Polyplastics Co., Ltd.

[Compound (B)]

B-1; phosphorus-based heat stabilizer "PEP36" manufactured by ADEKA CORPORATION (bis(2,6-di-tert-butyl-4-methylphenyl)pentaerythritol diphosphite)

B-2; sulfur-based compound; pentaerythritol-tetrakis-(3-dodecylthiopropionate), "SEENOX 412S" manufactured by SHIPRO KASEI KAISHA, LTD.

[Release Agent (C)]

C-1; paraffin wax "155° F. wax" manufactured by NIPPON SEIRO CO., LTD.

C-2; microcrystalline wax "Hi-Mic-1080" manufactured by NIPPON SEIRO CO., LTD.

[Filler (D)]

D-1; glass fiber T187 manufactured by Nippon Electric Glass Co., Ltd.

[Evaluation Methods]

The polyester resin or each resin composition was evaluated according to the following methods.

(1) Test Piece Production Method

Each pellet was dried under a nitrogen atmosphere at 120° C. for 6 hours. Next, the pellet dried was fed to an injection molding machine (EC-75SX manufactured by TOSHIBA MACHINE CO., LTD.), and an ISO test piece and an injection-molded plate (100 mm in width×100 mm in length×1 mm in thickness) were formed at a predetermined resin temperature and a predetermined mold temperature. The resin temperature and the mold temperature are represented in Table 4.

The ISO test piece was subjected to a high-temperature annealing treatment (150° C.×8 hr) before various evaluations (measurement of mechanical properties, and solder heat-resistance test).

The injection-molded plate was obtained by injection at 50 mm/sec until the filling rate was about 95%, and thereafter switching to pressure keeping. The holding pressure was gradually increased, and set to such an extent that the molded product had no sink marks.

TABLE 4

| | Base resin | | Molding conditions | |
| --- | --- | --- | --- | --- |
| | Type | Melting point ° C. | Resin temperature (° C.) | Mold temperature (° C.) |
| Example B1 | Resin B1 | 270 | 290 | 90 |
| Comparative Example B1 | Resin B1 | 270 | 290 | 90 |
| Reference Example B1 | Resin B2 | 224 | 250 | 90 |
| Reference Example B2 | Resin B3 | 270 | 290 | 90 |
| Reference Example B3 | Resin B4 | 278 | 300 | 90 |
| Reference Example B4 | Resin B5 | 290 | 310 | 90 |
| Example B2 | Resin B1 | 270 | 290 | 90 |
| Comparative Example B2 | Resin B1 | 270 | 290 | 90 |
| Reference Example B5 | Resin B6 | 224 | 250 | 90 |
| Reference Example B6 | Resin B7 | 270 | 290 | 90 |
| Reference Example B7 | Resin B8 | 278 | 300 | 90 |

(2) Evaluation of Mechanical Properties (Bending Test and Notched Charpy Test)

The ISO test piece obtained in (1) above was used to perform a bending test by a method according to ISO178. In addition, the ISO test piece was used to perform a notched Charpy test by a method according to ISO179.

(3) Heat Resistance Test (Solder Heat Resistance)

The ISO test piece obtained in (1) above was immersed in a solder bath manufactured by Nihon Dennetsu Co., Ltd., controlled to a predetermined temperature, for 20 seconds, and the degree of deformation was rated according to the following criteria.

○; almost no deformation; Δ; deformation; ×; significant deformation (4) Burr Evaluation The injection-molded plate obtained in (1) above was observed at a position 10 mm away from the side gate thereof by a digital microscope (KH-7700) manufactured by HIROX Co., Ltd., to measure the amount of burr. Herein, the amount of burr was obtained by measuring the length of the remaining object located outside of the intended molded article, according to the definition of JIS B 0051.

(5) Warpage Evaluation

The injection-molded plate obtained in (1) above was placed on a surface plate, and subjected to measurement of the amount of warpage at four corners, and the average value was defined as the amount of warpage of each material. Herein, any resin(s) not reinforced were/was slightly deformed in releasing, and evaluation of warpage thereof was not performed.

[Reduced Viscosity (ηsp/c)]

The reduced viscosity was determined from the solution viscosity obtained by subjecting a solution of a polyester resin obtained in each of Examples and Comparative Examples in phenol/1,1,2,2-tetrachloroethane (1:1 weight ratio), having a concentration of 0.5 g/dL, to measurement at 30° C.

[Sum (Vinyl Terminal Concentration) of Cyclovinylidene Terminal Represented by Formula (1) and Methylcyclohexene Terminal Represented by Formula (2)]

The sample was dissolved in a mixed solvent of hexafluoroisopropanol-d2/deuterated chloroform (weight ratio: 1/5), and subjected to $^1$H-NMR measurement using 400 MHz NMR manufactured by Brucker Japan K.K. The cyclovinylidene terminal represented by formula (1) was subjected to determination based on the peak at 4.6 to 4.7 ppm, and the methylcyclohexene terminal represented by formula (2) was subjected to determination based on the peak at 5.3 to 5.4 ppm. In addition, pyridine-d5 or Pr[fod]$_3$ was used as a shifting agent.

Production Example B1

Production of Resin B1

Production Example B1

The same production as in resin A3 was performed, thereby providing resin B1 having a reduced viscosity (ηsp/c) of 0.850 dL/g. The sum (vinyl terminal concentration) of the cyclovinylidene terminal represented by formula (1) and the methylcyclohexene terminal represented by formula (2) was 60 μeq/g.

Example B1

Resin B1, compound B-1, release agent C-1 and filler D-1 were melt-kneaded at proportions represented in Table 5 by a biaxial extruder (KZW-15-30MG-NH) manufactured by TECHNOVEL, extruded in the form of a strand through the outlet of the biaxial extruder, cooled and solidified by water, and thereafter formed into a pellet by a rotation type cutter. The resulting pellet was dried under a nitrogen stream at 120° C. for 6 hours, thereby providing a polyester resin composition. Herein, the set temperature in kneading was 280° C. and the number of screw rotations was 200 rpm.

The resulting polyester resin composition was used to form an ISO test piece and an injection-molded plate by injection molding as described above.

The resulting test piece was used to perform various evaluations. The results are represented in Table 5.

Comparative Production Example B1

Various evaluations were performed in the same manner as in Example B1 except that melt-kneading was made in the formulation represented in Table 5. The results are represented in Table 5.

Reference Examples B1 to B4

Each of the resins represented in Table 5 was injection-molded in the same conditions as in Example B1, thereby forming an ISO test piece and an injection-molded plate. The resulting test piece was used to perform various evaluations. The results are represented in Table 5.

Example B2

Various evaluations were performed in the same manner as in Example B1 except that melt-kneading was made in the formulation represented in Table 6. The results are represented in Table 6.

Comparative Production Example B2 and Reference Examples B5 to B7

Each of the resins represented in Table 6 was injection-molded in the same conditions as in Example B1, thereby forming an ISO test piece and an injection-molded plate. The resulting test piece was used to perform various evaluations. The results are represented in Table 6. Herein, any blank column in "Evaluation results" in Table 6 means that no evaluation was made.

TABLE 5

| | Resin composition | | | | | | | |
|---|---|---|---|---|---|---|---|---|
| | Resin | | Compound (B) | | Release agent (C) | | Filler (D) | |
| | Type | parts by weight | Type | parts by weight | Type | parts by weight | Type | parts by weight |
| Example B1 | Resin B1 | 100 | B-1 | 0.21 | C-1 | 0.29 | D-1 | 43 |
| Comparative Reference Example B1 | Resin B1 | 100 | — | — | — | — | D-1 | 43 |
| Reference Example B1 | Resin B2 | | | | | | | |
| Reference Example B2 | Resin B3 | | | | | | | |
| Reference Example B3 | Resin B4 | | | | | | | |
| Reference Example B4 | Resin B5 | | | | | | | |

| | Evaluation results | | | | | | | |
|---|---|---|---|---|---|---|---|---|
| | Mechanical properties | | | | | | Moldability | |
| | | | Notched | | | | | |
| | | Bending | Charpy | Heat resistance | | | Amount | Amount |
| | Bending strength MPa | elastic modulus MPa | impact value kJ/m² | 260° C. | 265° C. | 270° C. | of burr μm | of warpage mm |
| Example B1 | 182 | 7790 | 5.9 | ○ | ○ | ○ | 96 | 1.3 |
| Comparative Reference Example B1 | 184 | 7760 | 5.6 | ○ | ○ | ○ | 184 | 2.3 |
| Reference Example B1 | 179 | 7970 | 7.4 | x | x | x | 191 | 6.3 |
| Reference Example B2 | 157 | 8680 | 8.3 | ○ | ○ | ○ | 120 | 2.1 |
| Reference Example B3 | 221 | 9860 | 7.5 | ○ | ○ | ○ | 119 | 1.1 |
| Reference Example B4 | 150 | 7430 | 5.2 | ○ | ○ | ○ | 89 | 5.6 |

TABLE 6

| | Composition | | | | | Evaluation results | | | | | | |
| | | | | | | Mechanical properties | | | | | | Moldability |
| | Resin | | Compound (B) | | Release agent (C) | | Bending strength MPa | Bending elastic modulus MPa | Notched Charpy impact value kJ/m² | Heat resistance | | | Amount of burr μm |
| | Type | parts by weight | Type | parts by weight | Type | parts by weight | | | | 260° C. | 265° C. | 270° C. | |
|---|---|---|---|---|---|---|---|---|---|---|---|---|---|
| Example B2 | Resin B1 | 100 | B-2 | 0.20 | C-2 | 0.30 | 113 | 2530 | 1.7 | ○ | ○ | Δ | 99 |
| Comparative Reference Example B2 | Resin B1 | 100 | — | — | — | — | 118 | 2510 | 1.9 | ○ | ○ | — | 185 |
| Reference Example B5 | Resin B6 | | | | | | 87 | 2400 | 3.0 | x | x | x | 197 |
| Reference Example B6 | Resin B7 | | | | | | 68 | 2780 | 26.7 | — | — | — | 155 |
| Reference Example B7 | Resin B8 | | | | | | 139 | 3390 | 1.6 | — | — | — | 128 |

As clear from Examples B1 to B2 and Comparative Production Examples B1 to B2, any resin to which compound (B) was added had excellent moldability as compared with a single PCF resin to which no compound (B) was added. Furthermore, as clear from Examples B1 to B2 and Reference Examples B1 to B7, such any resin satisfied mechanical properties, heat resistance and moldability in an extremely well-balanced manner as compared with a conventionally known resin.

Next, additives for use in Example C and evaluation methods are represented.

[Additives]

E-1; epoxy "jER152" (polyglycidyl ether of phenol novolac) manufactured by Mitsubishi Chemical Corporation E-2; epoxy "jER828" (polycondensate of 4,4'-isopropylidene diphenol and 1-chloro-2,3-epoxypropane) manufactured by Mitsubishi Chemical Corporation E-3; carbodiimide compound "Carbodilite LA-1" (carbodiimide-modified isocyanate) manufactured by Nisshinbo Chemical Inc.

[Evaluation Methods]

(1) Residence Heat Stability Evaluation

Into a cylinder of a capillary rheometer (Capilograph 1B) manufactured by Toyo Seiki Seisaku-sho, Ltd. was loaded 8 g of each polyester resin composition, and the melt viscosity was measured at the time points where 5 minutes, 10 minutes and 20 minutes passed, respectively. In addition, the melt viscosity retention rate was calculated with respect to the melt viscosity retention rate after a lapse of 10 minutes (10η/5η) and the melt viscosity retention rate after a lapse of 20 minutes (20η/5η) based on the melt viscosity after a lapse of 5 minutes. In the measurement, the set temperature of the cylinder was 290° C., the shear speed was 91.2 sec$^{-1}$, the length of the capillary was 10 mm, and the diameter of the capillary was 1 mm.

In order that evaluation could be made by 8 g of each polyester resin composition, down stroke of a piston was made after 2 to 5 minutes, after 7 to 10 minutes and after 17 to 20 minutes, and the piston was not moved at any timings other than them.

(2) Heat Resistance Evaluation

Heat resistance evaluation was performed using a high sensitivity differential scanning calorimeter (DSC7020) manufactured by SII Nanotechnology Inc. Herein, the melting point was defined as the temperature of the endothermic peak observed in temperature rise of a sample from 30° C. to 300° C. at a rate of temperature rise of 10° C./min.

(3) Bending Test

A bending test piece (ISO test piece) was used to perform a bending test by a method according to ISO178.

[Reduced Viscosity (ηsp/c)]

The reduced viscosity was determined from the solution viscosity obtained by subjecting a solution of a polyester resin obtained in each of Examples and Comparative Examples in phenol/1,1,2,2-tetrachloroethane (1:1 weight ratio), having a concentration of 0.5 g/dL, to measurement at 30° C.

[Sum (Vinyl Terminal Concentration) of Cyclovinylidene Terminal Represented by Formula (1) and Methylcyclohexene Terminal Represented by Formula (2)]

The sample was dissolved in a mixed solvent of hexafluoroisopropanol-d2/deuterated chloroform (weight ratio: 1/5), and subjected to $^1$H-NMR measurement using 400 MHz NMR manufactured by Brucker Japan K.K. The cyclovinylidene terminal represented by formula (1) was subjected to determination based on the peak at 4.6 to 4.7 ppm, and the methylcyclohexene terminal represented by formula (2) was subjected to determination based on the peak at 5.3 to 5.4 ppm. In addition, pyridine-d5 or Pr[fod]$_3$ was used as a shifting agent.

Production Example C1

Production of Resin C1

Production Example C1

The same production as in resin A3 was performed, thereby providing resin C1 having a reduced viscosity (ηsp/c) of 0.879 dL/g. The sum (vinyl terminal concentration) of the cyclovinylidene terminal represented by formula (1) and the methylcyclohexene terminal represented by formula (2) was 63 μeq/g.

Production Example C2

Production of Resin C2

Resin C2 was obtained in the same manner as in Production Example C1. Resin C2 had a reduced viscosity (ηsp/c) of 0.929 dL/g. The sum (vinyl terminal concentration) of the cyclovinylidene terminal represented by formula (1) and the methylcyclohexene terminal represented by formula (2) was 56 μeq/g.

Example C1

Resin C1 and compound E-1 were melt-kneaded at proportions represented in Table 1 by a small-sized kneader (Xplore 15) manufactured by DSM Xplore, extruded in the form of a strand through the outlet of the kneader, cooled and thereafter formed into a pellet by a rotation type cutter. The resulting pellet was dried in vacuum at 100° C. for 4 hours, thereby providing a polyester resin composition for residence heat stability evaluation. Herein, the set temperature in kneading was 280° C., the number of screw rotations was 100 rpm, and the residence time was 3 minutes.

A bending test piece (ISO test piece) for the melting point measurement and the bending test was prepared by melt-kneading in the same manner as described above, extracting from the outlet of the kneader to a dedicated barrel, mounting of this dedicated barrel on a micro-injection molding machine (10 cc) manufactured by DSM Xplore, and thereafter injection molding. In the molding, the set temperature of the dedicated barrel was 290° C. and the mold temperature was 80° C. Furthermore, the bending test piece prepared was subjected to high-temperature annealing at 150° C. for 8 hours, and used for melting point measurement and the bending test.

The resulting polyester resin composition and the bending test piece subjected to high-temperature annealing were used to perform various evaluations. The results are represented in Table 7.

Example C2 to C6 and Comparative Production Examples C1 to C2

Each resin composition was produced in the same conditions as in Example C1 except that melt-kneading was made in the formulation represented in Table 7. The resulting resin composition was used to perform various evaluations in the same manner as in Example C1. The results are represented in Table 7. Herein, any blank column in "Evaluation results" in Table 7 means that no evaluation was made.

It has been found from Examples C1 to C6 and Comparative Production Examples C1 to C2 that a specified compound is added to a polyester resin, thereby resulting in a remarkable enhancement in residence heat stability without impairing of any heat resistance (melting point; Tm) and bending properties. Therefore, there is considered to be extremely useful for wide applications including automobile parts and electrical and electronic components.

The invention claimed is:

1. A polyester resin comprising a 2,5-furandicarboxylic acid unit and a 1,4-cyclohexanedimethanol unit as main constituent components,
    wherein an amount of a diol unit other than 1,4-cyclohexanedimethanol in the polyester resin is less than 1% by mol relative to the diol unit, and
    wherein the following (I) and (II) are satisfied:
    (I) a reduced viscosity ($\eta sp/c$) is 0.7 dL/g or more; and
    (II) a sum of a cyclovinylidene terminal represented by the following formula (1) and a methylcyclohexene terminal represented by the following formula (2) is 80 μeq/g or less

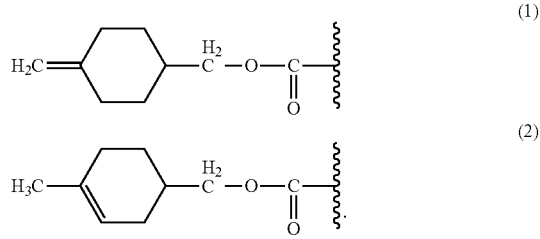

2. The polyester resin according to claim 1, wherein a difference between a melting point (Tm) and a cooling crystallization temperature (Tmc) measured by DSC is 50° C. or less.

3. The polyester resin according to claim 1, wherein the following (III) is further satisfied:
    (III) a carboxylic acid terminal is 30 μeq/g or less.

4. The polyester resin according to claim 1, comprising 0.5 to 1000 ppm of an alkali metal.

TABLE 7

| | Composition | | | | Evaluation results | | | | | Mechanical strength | | | |
| | Resin | | Compound | | Residence heat stability | | | | | Bending strength MPa | Bending elastic modulus MPa | Amount of bending displacement mm | Heat resistance Tm ° C. |
| | | | | | Melt viscosity | | | Melt viscosity retention rate | | | | | |
| | Type | parts by weight | Type | parts by weight | After 5 min Pa·s | After 10 min Pa·s | After 20 min Pa·s | 10η/5η % | 20η/5η % | | | | |
|---|---|---|---|---|---|---|---|---|---|---|---|---|---|
| Example C1 | Resin C1 | 100 | E-1 | 0.6 | 101.8 | 78.4 | 49.3 | 77.0 | 48.4 | 111 | 2440 | 8.9 | 276 |
| Example C2 | Resin C1 | 100 | E-1 | 1 | 122.7 | 95.6 | 68.5 | 77.9 | 55.8 | 112 | 2400 | 9.9 | 276 |
| Example C3 | Resin C1 | 100 | E-1 | 1.5 | 126.3 | 100.3 | 93.2 | 79.4 | 73.8 | 111 | 2440 | 9.3 | 276 |
| Example C4 | Resin C1 | 100 | E-1 | 2 | 135.3 | 101.8 | 84.8 | 75.2 | 62.7 | — | — | — | — |
| Example C5 | Resin C1 | 100 | E-2 | 0.6 | 103.1 | 67.0 | 39.7 | 65.0 | 38.5 | — | — | — | — |
| Comparative Reference Example C1 | Resin C1 | 100 | — | — | 89.5 | 54.2 | 29.8 | 60.5 | 33.3 | 103 | 2400 | 8.1 | 277 |
| Example C6 | Resin C2 | 100 | E-3 | 2 | 220.2 | 169.9 | 88.3 | 77.2 | 40.1 | — | — | — | — |
| Comparative Reference Example C2 | Resin C2 | 100 | — | — | 100.0 | 53.6 | 20.7 | 53.6 | 20.7 | — | — | — | — |

5. A polyester resin composition comprising the polyester resin according to claim 1.

6. The polyester resin composition according to claim 5, further comprising at least one compound selected from the group consisting of a phosphorus-based compound, a sulfur-based compound and a phenol-based compound.

7. The polyester resin composition according to claim 5, further comprising at least one compound selected from the group consisting of an epoxy-based compound, an isocyanate-based compound and a carbodiimide-based compound.

8. The polyester resin composition according to claim 5, further comprising a filler.

9. A method for producing the polyester resin of claim 1 by melt polymerization using a dicarboxylic acid and/or a dicarboxylic acid ester, and a diol, wherein the dicarboxylic acid and/or the dicarboxylic acid ester comprise(s) 2,5-furandicarboxylic acid and/or 2,5-furandicarboxylic acid ester, the diol comprises 1,4-cyclohexanedimethanol, the amount of the diol unit other than 1,4-cyclohexanedimethanol in the polyester resin is less than 1% by mol relative to the diol unit, and the method comprises the following (IV) and (V):

(IV) performing an esterification or transesterification reaction; and thereafter, (V) performing polycondensation under reduced pressure at a temperature (t1) represented by the following expression (3):

$$Tm \leq t1 \leq Tm + 15° C. \qquad (3)$$

Tm: melting point of polyester resin.

10. The method according to claim 9, further comprising the following (VI):

(VI) performing solid phase polymerization at a temperature (t2) represented by the following expression (4), after melt polymerization:

$$t2 \leq Tm \qquad (4)$$

Tm: melting point of polyester resin.

11. The polyester resin according to claim 1, wherein the diol unit other than 1,4-cyclohexanedimethanol is at least one selected from the group consisting of ethylene glycol, diethylene glycol, triethylene glycol, 1,3-propanediol, 1,2-propanediol, 1,4-butanediol, 1,5-pentanediol, 1,6-hexanediol, 1,4-cyclohexanediol, and isosorbide.

12. The polyester resin according to claim 1, wherein the polyester resin does not comprise a diol unit other than 1,4-cyclohexanedimethanol.

\* \* \* \* \*